US011829866B1

(12) United States Patent
Feinstein et al.

(10) Patent No.: US 11,829,866 B1
(45) Date of Patent: Nov. 28, 2023

(54) SYSTEM AND METHOD FOR HIERARCHICAL DEEP SEMI-SUPERVISED EMBEDDINGS FOR DYNAMIC TARGETED ANOMALY DETECTION

(71) Applicant: Intuit Inc., Mountain View, CA (US)

(72) Inventors: Efraim Feinstein, Palo Alto, CA (US); Riley F. Edmunds, River Forest, IL (US)

(73) Assignee: Intuit Inc., Mountain View, CA (US)

( * ) Notice: Subject to any disclaimer, the term of this patent is extended or adjusted under 35 U.S.C. 154(b) by 1441 days.

(21) Appl. No.: 15/855,702

(22) Filed: Dec. 27, 2017

(51) Int. Cl.
| | |
|---|---|
| G06N 3/047 | (2023.01) |
| G06N 3/045 | (2023.01) |
| G06N 3/08 | (2023.01) |
| H04L 9/40 | (2022.01) |

(52) U.S. Cl.
CPC ............. *G06N 3/08* (2013.01); *G06N 3/045* (2023.01); *G06N 3/047* (2023.01); *H04L 63/0272* (2013.01); *H04L 63/1425* (2013.01)

(58) Field of Classification Search
CPC ....... G06N 3/08; G06N 3/0454; G06N 3/0472
See application file for complete search history.

(56) References Cited

U.S. PATENT DOCUMENTS

| | | | |
|---|---|---|---|
| 6,826,536 B1 | 11/2004 | Forman | |
| 7,686,214 B1 | 3/2010 | Shao et al. | |
| 7,813,944 B1 | 10/2010 | Luk et al. | |
| 7,840,455 B1 | 11/2010 | Venkatasubramanian et al. | |
| 7,954,698 B1 | 6/2011 | Pliha | |
| 8,346,691 B1 | 1/2013 | Subramanian et al. | |
| 8,463,676 B1 | 6/2013 | Dinamani et al. | |
| 8,607,353 B2 | 12/2013 | Rippert, Jr. et al. | |
| 8,639,522 B2 | 1/2014 | Pathria et al. | |
| 8,776,168 B1 | 7/2014 | Gibson et al. | |
| 8,966,640 B1 | 2/2015 | Peddada et al. | |

(Continued)

FOREIGN PATENT DOCUMENTS

| | | |
|---|---|---|
| EP | 2840542 A2 | 2/2015 |
| KR | 10-2006-0090834 | 8/2006 |

(Continued)

OTHER PUBLICATIONS

Schreyer et al., "Detection of Anomalies in Large Scale Accounting Data using Deep Autoencoder Networks", Sep. 2017 (Year: 2017).*

(Continued)

*Primary Examiner* — Selene A. Haedi
(74) *Attorney, Agent, or Firm* — Paradice & Li LLP

(57) ABSTRACT

A method and system distinguish between anomalous members of a majority group and members of a target group. The system and method utilize a neural network architecture that attends to each level of a classification hierarchy. The system and method chain a semi-supervised autoencoder with a supervised classifier neural network. The autoencoder is trained in a semi-supervised manner with a machine learning process to identify user profile data that are typical of a majority class. The classifier neural network is trained in a supervised manner with a machine learning process to distinguish between user profile data that are anomalous members of the majority class and user profile data that are members of the target class.

22 Claims, 7 Drawing Sheets

(56) References Cited

U.S. PATENT DOCUMENTS

| | | |
|---|---|---|
| 9,038,134 B1 | 5/2015 | Ackerman et al. |
| 9,171,334 B1 | 10/2015 | Visbal et al. |
| 9,990,678 B1 | 6/2018 | Cabrera et al. |
| 10,019,535 B1 | 7/2018 | Madhani et al. |
| 10,083,452 B1 | 9/2018 | Cox |
| 10,373,140 B1 | 8/2019 | Chang et al. |
| 10,387,980 B1 | 8/2019 | Shahidzadeh et al. |
| 10,755,281 B1 | 8/2020 | Yip et al. |
| 11,087,334 B1 | 8/2021 | McEachern et al. |
| 2002/0052841 A1 | 5/2002 | Guthrie et al. |
| 2003/0229519 A1 | 12/2003 | Eidex et al. |
| 2007/0294104 A1 | 12/2007 | Boaz et al. |
| 2007/0294195 A1 | 12/2007 | Curry et al. |
| 2008/0040779 A1 | 2/2008 | Budzichowski |
| 2008/0081601 A1 | 4/2008 | Moshir et al. |
| 2008/0086342 A1 | 4/2008 | Curry et al. |
| 2009/0012896 A1 | 1/2009 | Arnold |
| 2009/0099884 A1 | 4/2009 | Hoefelmeyer et al. |
| 2009/0239650 A1 | 9/2009 | Alderucci |
| 2010/0077445 A1 | 3/2010 | Schneider et al. |
| 2010/0082384 A1 | 4/2010 | Bohrer et al. |
| 2010/0332362 A1 | 12/2010 | Ramsey et al. |
| 2011/0078062 A1 | 3/2011 | Kleyman |
| 2011/0225076 A1 | 9/2011 | Wang et al. |
| 2011/0231257 A1 | 9/2011 | Winter |
| 2011/0282695 A1 | 11/2011 | Blue |
| 2012/0030076 A1 | 2/2012 | Checco et al. |
| 2012/0030079 A1 | 2/2012 | Slater et al. |
| 2012/0030080 A1 | 2/2012 | Slater et al. |
| 2012/0030083 A1 | 2/2012 | Newman et al. |
| 2012/0036053 A1 | 2/2012 | Miller |
| 2012/0047072 A1 | 2/2012 | Larkin |
| 2012/0101927 A1 | 4/2012 | Leibon et al. |
| 2012/0109734 A1 | 5/2012 | Fordyce et al. |
| 2012/0226591 A1 | 9/2012 | Ramsey et al. |
| 2012/0311684 A1 | 12/2012 | Paulsen et al. |
| 2012/0317027 A1 | 12/2012 | Luk et al. |
| 2013/0117278 A1 | 5/2013 | Martens et al. |
| 2013/0151388 A1 | 6/2013 | Falkenborg et al. |
| 2013/0179314 A1 | 7/2013 | Stoke et al. |
| 2013/0226785 A1 | 8/2013 | Krake et al. |
| 2013/0346302 A1 | 12/2013 | Purves et al. |
| 2014/0012716 A1 | 1/2014 | Bucholz |
| 2014/0058910 A1 | 2/2014 | Abeles |
| 2014/0180883 A1 | 6/2014 | Regan |
| 2014/0195924 A1 | 7/2014 | Curtis et al. |
| 2014/0278479 A1 | 9/2014 | Wang et al. |
| 2014/0379531 A1 | 12/2014 | Huang et al. |
| 2015/0012430 A1 | 1/2015 | Chisholm et al. |
| 2015/0033305 A1 | 1/2015 | Shear et al. |
| 2015/0046181 A1 | 2/2015 | Adjaoute |
| 2015/0073981 A1* | 3/2015 | Adjaoute ........... G06Q 30/0225 705/39 |
| 2015/0095247 A1* | 4/2015 | Duan ................. G06Q 30/0185 705/318 |
| 2015/0161622 A1 | 6/2015 | Hoffmann et al. |
| 2015/0220734 A1 | 8/2015 | Nalluri et al. |
| 2015/0278462 A1 | 10/2015 | Smoley et al. |
| 2015/0332414 A1 | 11/2015 | Unser et al. |
| 2015/0370978 A1 | 12/2015 | Van Arkel et al. |
| 2016/0012480 A1 | 1/2016 | Sharan et al. |
| 2016/0012561 A1 | 1/2016 | Lappenbusch et al. |
| 2016/0063644 A1 | 3/2016 | Ciaramitaro et al. |
| 2016/0063645 A1 | 3/2016 | Houseworth et al. |
| 2016/0071208 A1 | 3/2016 | Straub et al. |
| 2016/0078567 A1 | 3/2016 | Goldman et al. |
| 2016/0085986 A1 | 3/2016 | Long |
| 2016/0086185 A1 | 3/2016 | Adjaoute |
| 2016/0110512 A1 | 4/2016 | Adjaoute |
| 2016/0112451 A1 | 4/2016 | Jevans |
| 2016/0148321 A1 | 5/2016 | Ciaramitaro et al. |
| 2016/0180484 A1 | 6/2016 | Roebuck |
| 2016/0247239 A1 | 8/2016 | Houseworth et al. |
| 2016/0259896 A1 | 9/2016 | Yang |
| 2016/0260014 A1* | 9/2016 | Hagawa ............... G06N 3/0454 |
| 2016/0267484 A1 | 9/2016 | Smoley et al. |
| 2016/0379182 A1 | 12/2016 | Sheng et al. |
| 2017/0017760 A1 | 1/2017 | Freese et al. |
| 2017/0032251 A1 | 2/2017 | Podgorny |
| 2017/0061093 A1 | 3/2017 | Amarasingham et al. |
| 2017/0061322 A1* | 3/2017 | Chari .................. H04L 63/1425 |
| 2017/0076224 A1* | 3/2017 | Munawar ............... G06N 3/045 |
| 2017/0148021 A1 | 5/2017 | Goldstein et al. |
| 2017/0177809 A1 | 6/2017 | Bull et al. |
| 2017/0178249 A1 | 6/2017 | Pigoski, II et al. |
| 2017/0186097 A1 | 6/2017 | Mascaro et al. |
| 2017/0200137 A1 | 7/2017 | Vilmont |
| 2017/0221058 A1 | 8/2017 | Choudhary et al. |
| 2017/0270526 A1 | 9/2017 | Fitzgerald |
| 2017/0270629 A1 | 9/2017 | Fitzgerald |
| 2017/0293763 A1 | 10/2017 | Shear et al. |
| 2017/0293917 A1 | 10/2017 | Dhurandhar et al. |
| 2017/0301034 A1 | 10/2017 | Golasz |
| 2017/0372318 A1 | 12/2017 | Shami et al. |
| 2018/0033006 A1 | 2/2018 | Goldman et al. |
| 2018/0033009 A1 | 2/2018 | Goldman et al. |
| 2018/0033089 A1 | 2/2018 | Goldman et al. |
| 2018/0144241 A1* | 5/2018 | Liu ...................... G06N 3/0454 |
| 2018/0211332 A1 | 7/2018 | Kraemer et al. |
| 2018/0239870 A1 | 8/2018 | Goldman et al. |
| 2018/0253336 A1 | 9/2018 | Juretic et al. |
| 2018/0276541 A1* | 9/2018 | Studnitzer ............. G06Q 40/04 |
| 2018/0350006 A1 | 12/2018 | Agarwal et al. |
| 2019/0066248 A1 | 2/2019 | McEachern et al. |
| 2019/0102277 A1* | 4/2019 | Walenstein ............. G06F 11/36 |
| 2020/0257964 A1* | 8/2020 | Caelen ................ G06N 3/0472 |
| 2021/0035119 A1 | 2/2021 | Hayman et al. |
| 2021/0374764 A1* | 12/2021 | Kramme ............. G06Q 20/102 |

FOREIGN PATENT DOCUMENTS

| | | |
|---|---|---|
| KR | 101565957 B2 | 11/2015 |
| WO | 2019237208 A1 | 12/2019 |

OTHER PUBLICATIONS

Castellini et al., "Fake Twitter Followers Detection by Denoising Autoencoder", Aug. 2017 (Year: 2017).*

Zhang et al., "An imbalanced data classification algorithm of improved autoencoder neural network", 2016 (Year: 2016).*

Hasham et al., "Combating Payments Fraud and Enhancing Customer Experience," Date: Sep. 26, 2018, retrieved from the internet, [https://www.mckinsey.com/industries/financial-services/our-insights/combating-payments-fraud-and-enhacing-customer-experience, 20-pages (Year: 2018).

Unger, "There's Never a Finish Line in the Race to Understand Technology. Keeping Up Is the Only Way to Get Ahead," Bank Technology News, Nov. 2002, 15.11:44. SourceMedia, Inc., 9 pages.

Moritz et al., "Fraud Risk Assessment—Identifying Vulnerabilities to Fraud and Misconduct," 2013 [online]. Retrieved from the Internet: <https://www.protiviti.com/US-en/insights/fraud-risk-assessment-identifying-vulnerabilities-fraud-and-misconduct>, 7 pages.

* cited by examiner

SYSTEM AND METHOD FOR HIERARCHICAL DEEP SEMI-SUPERVISED EMBEDDINGS FOR DYNAMIC TARGETED ANOMALY DETECTION

BACKGROUND

Data management systems provide valuable data management services to users. Data management systems store large amounts of user data and provide valuable processing services related to the user data. For example, some data management systems provide financial management services to users, including managing and tracking financial transactions of users in a centralized manner that enables users to be apprised of all of their financial dealings from a single data management system.

However, due to the convenience and ease of use of data management systems, fraudsters utilize various means and strategies to commit fraud via the data management system. Some fraudsters attempt to exploit personal financial management systems with list validation attacks in which the fraudster obtains a list of credit card numbers illegally and validates their legitimacy by connecting them in sequence to a personal financial management system. A list validation attack often results in many authentication failures. Traditional financial management systems are trained to identify such behavior as fraudulent.

However, in many cases, legitimate users of a financial management system can exhibit behavior that resembles a list validation attack. For example, a user of the traditional financial management system may mistype credit card numbers multiple times when attempting to initially link credit cards to the financial management system. The traditional financial management system is likely unable to distinguish between this behavior of a legitimate user and that of the list validation attack and identifies the behavior as fraudulent. Accordingly, the traditional financial management system may lock the user out of the user's newly opened account.

The failure of the traditional financial management system to distinguish between fraudulent behavior and anomalous benign behavior can lead to many serious consequences. Users may become frustrated with the financial management system and abandon the financial management system. Worse yet, users that are locked out of the financial management system may suffer serious financial harm if they are unable to access their financial management data. Furthermore, the financial management system may expend large amounts of human and computing resources in a fruitless effort to distinguish between fraudulent behavior and anomalous benign behavior.

The inability to distinguish between fraudulent behavior and anomalous benign behavior extends to many situations other than data management situations. Dynamic targeted anomaly detection problems are difficult to solve because, while it is relatively simple to delineate between average or typical members of a majority class and a target class, it is tremendously difficult to differentiate between anomalous members of the majority class and the target class. Dynamic targeted anomaly detection problems are difficult to solve due to the fact that, often, the number of non-fraudulent cases recorded far exceeds the number of known fraudulent cases. Additionally, fraudulent behavior is always changing as fraudsters adapt in order to circumvent new defense mechanisms.

Accordingly, there exists a long standing technical problem in data management systems, and in many other technical fields, in the form of an inability to accurately distinguishing between anomalous members of a majority class and members of a target class. What is needed is a method and system that provides a technical solution to the technical problem of accurately and efficiently distinguishing between anomalous members of a majority class and members of the target class.

SUMMARY

Embodiments of the present disclosure provide one or more technical solutions to the technical problem of data management systems that are unable to accurately and efficiently distinguish between anomalous members of a majority class and members of a target class. The technical solutions include utilizing a neural network architecture that attends to each level of the classification hierarchy. Embodiments of the present disclosure chain a semi-supervised autoencoder with a supervised classifier neural network. The autoencoder is trained in a semi-supervised manner with a machine learning process to identify user data profiles that are typical of a majority class. The classifier neural network is trained in a supervised manner with a machine learning process to distinguish between user data profiles that are anomalous members of the majority class and user data profiles that are members of the target class. Accordingly, user data profiles are passed through the autoencoder. The autoencoder filters out user data profiles that are typical of the majority class and passes to the classifier those user data profiles that are not typical members of the majority class. The classifier, which has been trained to distinguish between anomalous members of the majority class and members of the target class, classifies the filtered user data profiles as members of the target class or as anomalous members of the majority class.

Embodiments of the present disclosure overcome the drawbacks of traditional data management systems that are unable to distinguish between anomalous members of the majority class and members of the target class. Embodiments of the present disclosure overcome these drawbacks by providing a chained neural network architecture that filters out the user data profiles that are typical of the majority class, and accurately and efficiently classifies the remaining user data profiles as either anomalous members of the majority class or members of the target class.

Figure 1A:
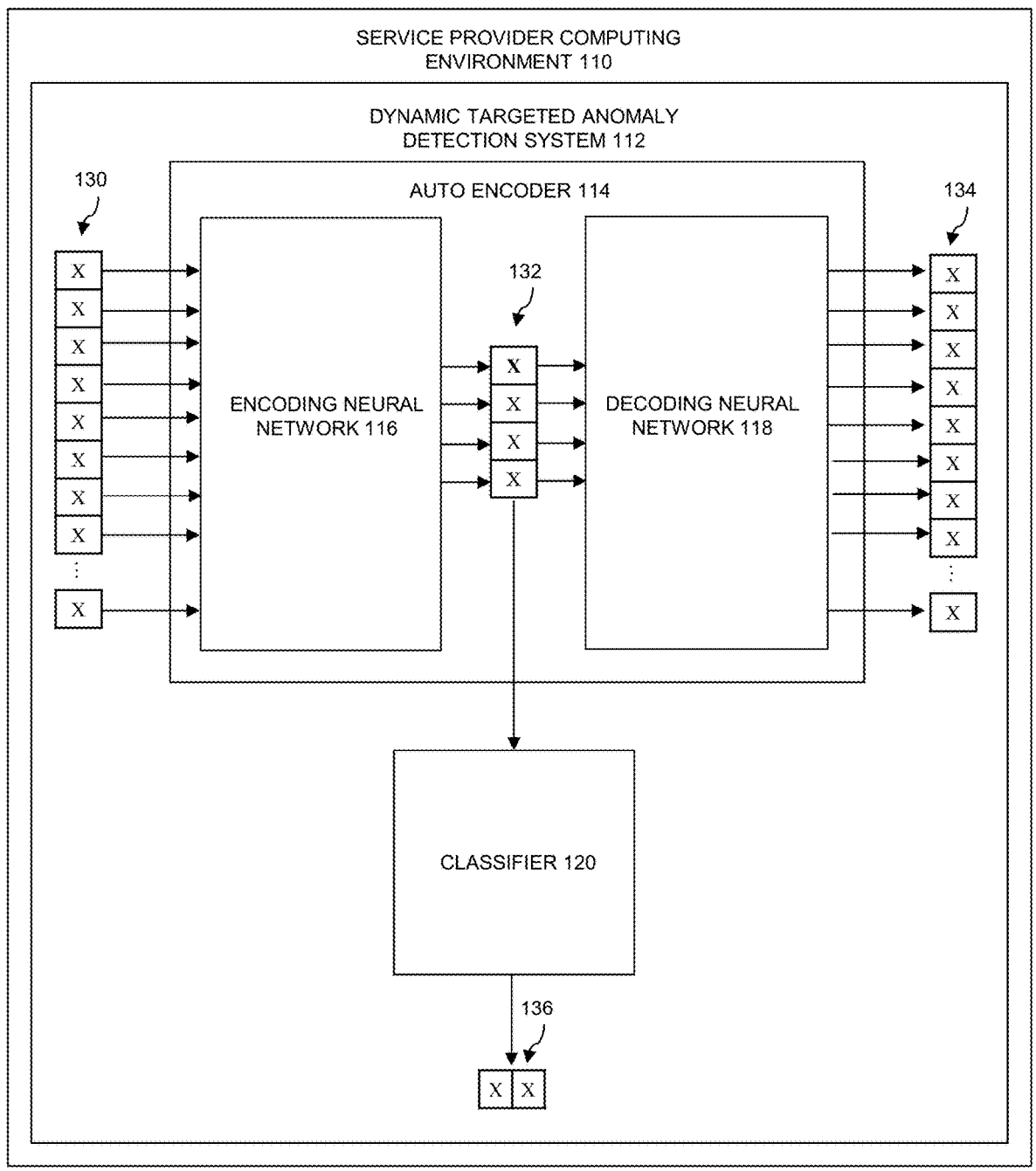
FIG. 1A is a block diagram of software architecture for efficiently and accurately distinguishing between anomalous members of a majority class and members of a target minority class, in accordance with one embodiment.

Common reference numerals are used throughout the FIGs and the detailed description to indicate like elements. One skilled in the art will readily recognize that the above FIGs are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs, which depict one or more exemplary embodiments. Embodiments may be implemented in many different forms and should not be construed as limited to the embodiments set forth herein, shown in the FIGs, and described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually connected, physically connected, or otherwise associated with one another, to provide the production environment implementing the application.

As specific illustrative examples, the assets making up a given production environment can include, but are not limited to, one or more computing environments used to implement the application in the production environment such as one or more of a data center, a cloud computing environment, a dedicated hosting environment, and other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control one or more assets or components of the production environment; one or more communications channels for sending and receiving data used to implement the application in the production environment; one or more access control systems for limiting access to various components of the production environment, such as firewalls and gateways; one or more traffic or routing systems used to direct, control, or buffer, data traffic to components of the production environment, such as routers and switches; one or more communications endpoint proxy systems used to buffer, process, or direct data traffic, such as load balancers or buffers; one or more secure communication protocols or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; or any other assets/components making up an actual production environment in which an application is deployed, implemented, accessed, and run, e.g., operated, as discussed herein, or as known in the art at the time of filing, or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes or operations as described herein.

As used herein, the term "computing environment" includes, but is not limited to, a logical or physical grouping of connected or networked computing systems or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems or virtual assets making up the trusted computing environment, are either under the control of, or known to, a party.

In various embodiments, each computing environment includes allocated assets and virtual assets associated with, and controlled or used to create, deploy, or operate an application.

In various embodiments, one or more cloud computing environments are used to create, deploy, or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, or as known in the art at the time of filing, or as developed after the time of filing.

In many cases, a given application or service may utilize, and interface with, multiple cloud computing environments, such as multiple VPCs, in the course of being created, deployed, or operated.

As used herein, the term "virtual asset" includes any virtualized entity or resource or virtualized part of an actual "bare metal" entity. In various embodiments, the virtual assets can be, but are not limited to, virtual machines, virtual servers, and instances implemented in a cloud computing environment; databases associated with a cloud computing environment, or implemented in a cloud computing environment; services associated with, or delivered through, a cloud computing environment; communications systems used with, part of, or provided through, a cloud computing environment; or any other virtualized assets or sub-systems of "bare metal" physical devices such as mobile devices, remote sensors, laptops, desktops, point-of-sale devices, etc., located within a data center, within a cloud computing environment, or any other physical or logical location, as discussed herein, or as known/available in the art at the time of filing, or as developed/made available after the time of filing.

In various embodiments, any, or all, of the assets making up a given production environment discussed herein, or as known in the art at the time of filing, or as developed after the time of filing, can be implemented as one or more virtual assets.

In one embodiment, two or more assets, such as computing systems or virtual assets, two or more computing environments, are connected by one or more communications channels including but not limited to, Secure Sockets Layer communications channels and various other secure communications channels, or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, or virtual assets, as discussed herein, or available or known at the time of filing, or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, or computing systems, whether available or known at the time of filing or as later developed.

As used herein, the term "user" includes, but is not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "relationship(s)" includes, but is not limited to, a logical, mathematical, statistical, or other association between one set or group of information, data, or users and another set or group of information, data, or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed data management system determines a relationship between a first group of data and a second group of data, then a characteristic or subset of a first group of data can be related to, associated with, or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

In one embodiment, the data management system generates grouping data based on an analysis of how previous versions of software code were executed for each historical user. The data management system executes prior code data for each historical user. The prior code data corresponds to a previous calculation used by the data management system for generating the data values that will be generated by the new calculation data to be tested. When the data management system executes the prior code data for each historical user, the data management system generates trace log data that indicates which sections of the previous code were executed for each historical user. The data management system executes, for each historical user, only certain portions of the prior code data based on the attributes of the historical user. Other portions of the prior code data are not executed based on the attributes of the historical user. Historical users with similar attributes results in the execution of similar sections of the prior code data. The data management system generates the grouping data by grouping the users based on which sections of the prior code data were executed for those users. The data management system selects the groups such that the combination of groups represents execution of all sections of the prior code data. Sampling a small number of historical users from each group will therefore result in a training set that covers virtually the entire range of historical users.

Embodiments of the present disclosure address some of the shortcomings associated with traditional data management systems that are unable to distinguish between anomalous members of a majority class and a target class. A data management system in accordance with one or more embodiments accurately and efficiently distinguishes between anomalous members of a majority class and members of a target class. The various embodiments of the disclosure can be implemented to improve the technical fields of data processing, data management, data analysis, and data collection. Therefore, the various described embodiments of the disclosure and their associated benefits amount to significantly more than an abstract idea. In particular, by generating efficient training sets for testing new processes for preparing electronic documents for users of a data management system, the data management system can learn and incorporate new forms more efficiently.

Using the disclosed embodiments of a method and system for efficiently and accurately distinguishing between anomalous members of a majority class and members of a target minority class, a method and system for efficiently and accurately distinguishing between anomalous members of a majority class and members of a target minority class more accurately is provided. Therefore, the disclosed embodiments provide a technical solution to the long standing technical problem of efficiently and accurately distinguishing between anomalous members of a majority class and members of a target minority class.

The disclosed embodiments of a method and system for efficiently and accurately distinguishing between anomalous members of a majority class and members of a target minority class are also capable of dynamically adapting to constantly changing fields such as personal financial management and other kinds of data management systems. Consequently, the disclosed embodiments of a method and system for efficiently and accurately distinguishing between anomalous members of a majority class and members of a target minority class also provide a technical solution to the long standing technical problem of static and inflexible data management systems.

The result is a much more accurate, adaptable, and robust method and system for efficiently and accurately distinguishing between anomalous members of a majority class and members of a target minority class. This, in turn, results in: less human and processor resources being dedicated to distinguishing between anomalous members of a majority class and members of a target class because more accurate and efficient analysis methods can be implemented, i.e., usage of fewer processing resources, usage of fewer memory storage assets, and less communication bandwidth being utilized to transmit data for analysis.

The disclosed method and system for efficiently and accurately distinguishing between anomalous members of a majority class and members of a target minority class does not encompass, embody, or preclude other forms of innovation in the area of data management systems. In addition, the disclosed method and system for efficiently and accurately distinguishing between anomalous members of a majority class and members of a target minority class is not related to any fundamental economic practice, fundamental data processing practice, mental steps, or pen and paper based solutions, and is, in fact, directed to providing solutions to new and existing problems associated with data management systems. Consequently, the disclosed method and system for efficiently and accurately distinguishing between anomalous members of a majority class and members of a target minority class, does not encompass, and is not merely, an abstract idea or concept.

Figure 1B:
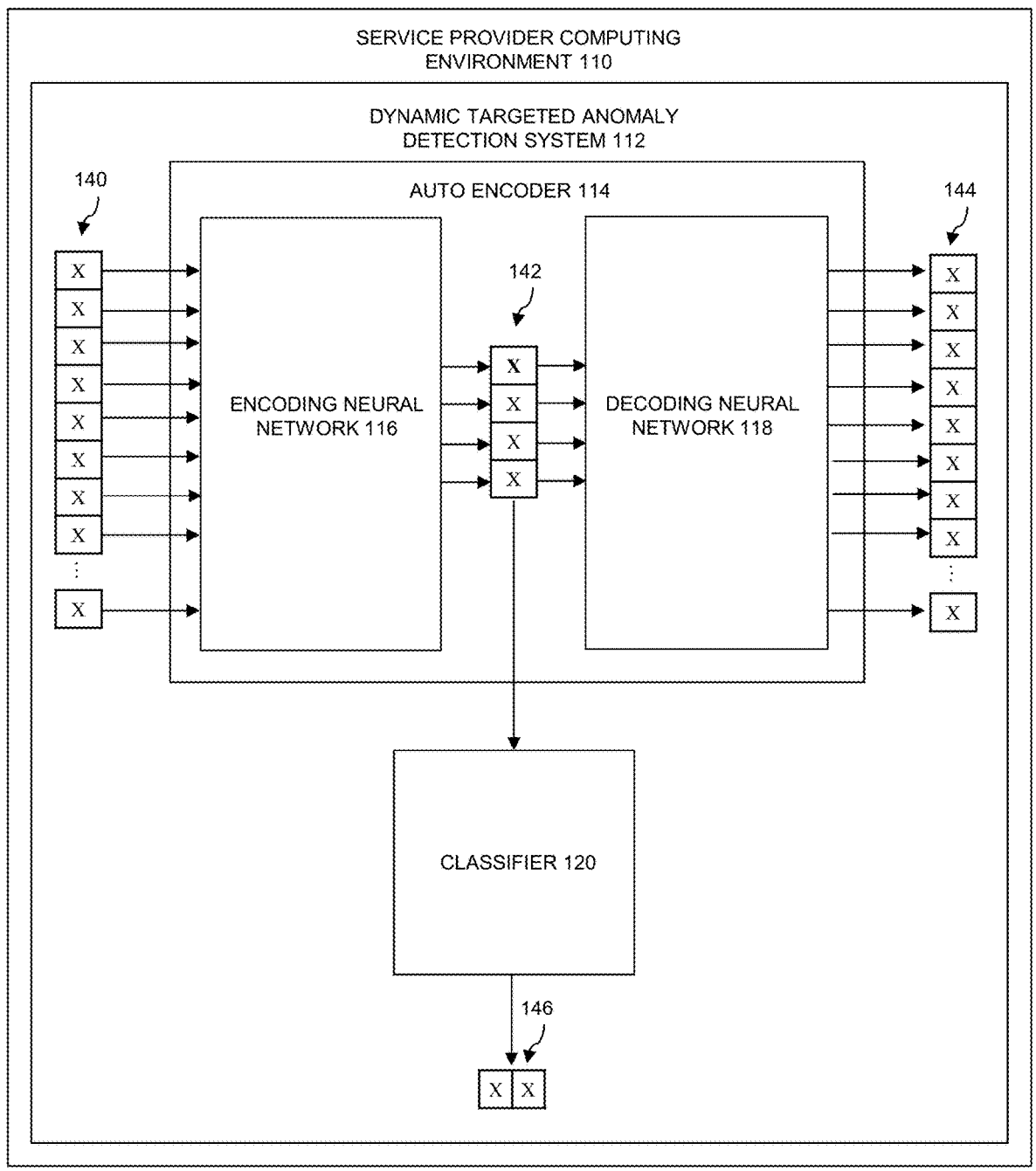
FIG. 1B is a block diagram of software architecture for efficiently and accurately distinguishing between anomalous members of a majority class and members of a target minority class, in accordance with one embodiment.

FIGS. 1A and 1B illustrate a block diagram of a production environment 100 for efficiently and accurately distinguishing between anomalous members of a majority class and members of a target minority class, according to one embodiment. Embodiments of the present disclosure provide methods and systems for efficiently and accurately distinguishing between anomalous members of a majority class and members of a target minority class, according to one embodiment. Embodiments of the present disclosure distinguish between anomalous members of the majority class and members of a target class by implementing a hierarchical approach. Embodiments of the present disclosure first distinguish between the expected members of the majority class and the target class, via the semi-supervised machine learning. Embodiments of the present disclosure then distinguish between the anomalous members of the majority class and the target class via deep supervised machine learning.

Embodiments of the present disclosure distinguish between the expected members of the majority class and the target class with a semi-supervised autoencoder. Embodiments of the present disclosure train the autoencoder with a semi-supervised machine learning process with training set data that includes training data profiles that are known to be typical of the expected distribution of the majority class. The autoencoder includes a first neural network that generates deconstructed training data profiles by compressing the training data profiles. The autoencoder includes a second neural network that generates reconstructed training data profiles by reconstructing the training data profiles from the deconstructed training data profiles. The machine learning process iteratively adjusts the parameters of the first and second neural networks until the autoencoder reliably generates reconstructed training data profiles that match, within a tolerance, the training data profiles. In this way, embodiments of the present disclosure train an autoencoder to reliably identify data profiles that are typical of the majority class.

Embodiments of the present disclosure distinguish between anomalous members of the majority class and members of the target class with a supervised classifier. Embodiments of the present disclosure train the supervised classifier with a supervised machine learning process with training set data that includes training data profiles that are known to represent either anomalous members of the majority class or members of the target class. The classifier includes a third neural network that receives, as input, deconstructed training profile data that corresponds to training profiles that the autoencoder is not able to accurately reconstruct. The classifier receives the deconstructed training profile data from the autoencoder and classifies each training profile as either an anomalous member of the majority class or a member of the target class. The machine learning process monitors the accuracy of the classification and iteratively adjust the parameters of the third neural network until the classifier is able to accurately classify, within a tolerance, the deconstructed training profile data.

After the autoencoder and the classifier have been trained, embodiments of the present disclosure are able to distinguish between anomalous members of the majority class and members of the target class. Embodiments of the present disclosure feed user profile data including user profiles to the autoencoder. The autoencoder receives each user profile and generates deconstructed user profile data. The autoencoder then generates reconstructed user profile data by reconstructing the deconstructed user profile data. The autoencoder compares the reconstructed user profile data to the user profile data. Reconstructed user profiles that match the user profiles within a tolerance are filtered out because they correspond to expected members of the majority class. For reconstructed user profiles that do not match the user profiles within a tolerance, the corresponding deconstructed user profile data is provided to the classifier. The classifier generates classification data that classifies each deconstructed user profile as either a member of the target class or as an anomalous member of the majority class.

The disclosed method and system for efficiently and accurately distinguishing between anomalous members of a majority class and members of a target minority class provides for significant improvements to the technical fields of electronic data management, data processing, and data transmission.

The disclosed method and system for efficiently and accurately distinguishing between anomalous members of a majority class and members of a target minority class provide for the processing and storing of smaller amounts of data, i.e., for the more efficient analysis of profile data; thereby eliminating unnecessary data analysis and storage. Consequently, using the disclosed method and system for efficiently and accurately distinguishing between anomalous members of a majority class and members of a target minority class results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for efficiently and accurately distinguishing between anomalous members of a majority class and members of a target minority class.

Referring to FIG. 1A, the production environment 100 includes a service provider computing environment 110 for efficiently and accurately distinguishing between anomalous members of a majority class and members of a target minority class, according to one embodiment. The service provider computing environment 110 represents one or more computing systems such as one or more servers or distribution centers that are configured to receive, execute, and host one or more data management systems (e.g., applications) for access by one or more users, for efficiently and accurately distinguishing between anomalous members of a majority class and members of a target minority class, according to one embodiment. The service provider computing environment 110 can represent a traditional data center computing environment, a virtual asset computing environment (e.g., a cloud computing environment), a hybrid between a traditional data center computing environment and a virtual asset computing environment, or other kinds of computing environments, as discussed herein, known in the art, or as become known after the time of filing, according to one embodiment.

In one embodiment, the service provider computing environment 110 includes a dynamic targeted anomaly detection system 112, according to one embodiment. The dynamic targeted anomaly detection system 112 is configured to distinguish between anomalous members of a majority class and members of a target class.

The dynamic targeted anomaly detection system 112 includes an autoencoder 114 and a classifier 120, according to various embodiments. The autoencoder 114 and the classifier 120 cooperate together to dynamically distinguish between anomalous members of a majority class and members of a target class, according to one embodiment.

FIG. 1A is a block diagram of the dynamic targeted anomaly detection system 112 during a training phase of the dynamic targeted anomaly detection system 112, according to one embodiment. The dynamic targeted anomaly detection system 112 is trained to distinguish between anomalous members of a majority class and members of a target class before the dynamic targeted anomaly detection system 112 is able to distinguish between anomalous members of a majority class and members of a target class.

Figure 2A:
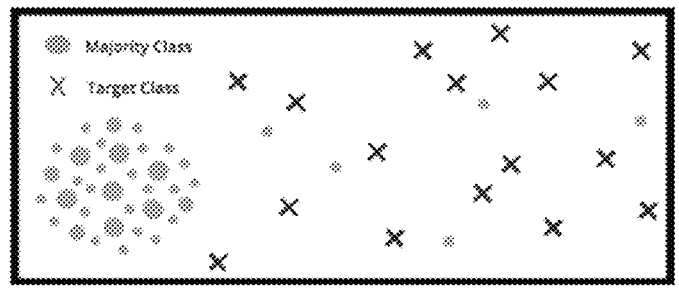
FIG. 2A is an illustration of a distribution of members of a majority class and of a target class in a distribution space, according to one embodiment.

In one embodiment, the difficulty in distinguishing between anomalous members of a majority class and members of the target class is illustrated with reference to FIG. 2A. FIG. 2A is a simplified representation of a distribution of members of a majority class and members of a target class, according to one embodiment. Individual members of the majority class are represented by circles. Individual members of the target class are represented by Xs. The positions of the members of the majority class and the target class correspond to the characteristics of the members of the majority class and the target class.

Referring to FIG. 2A, most members of the majority class are clustered together in a particular area of the distribution, according to one embodiment. This is because most members of the majority class have similar characteristics. Thus, the cluster of members of the majority class corresponds to members of the majority class having characteristics that are typical or expected of members of the majority class.

In one embodiment, the target class is distributed throughout the remainder of the distribution space not occupied by the main cluster of the members of the majority class. This is because, in one embodiment, members of the target class have characteristics that are easily distinguishable from typical members of the majority class.

In one embodiment, anomalous members of the majority class are interspersed among the members of the target class. This is because there exist members of the majority class that have characteristics that are atypical of the main cluster of members of the majority class. In many instances, the anomalous members of the majority class have characteristics that are similar to members of the target class, according to various embodiments.

In one embodiment, in a distribution as shown in FIG. 2A, typical members of the majority class are readily distinguished from members of the target class. To the contrary, anomalous members of the majority class are not easily distinguished from members of the target class. This serves to illustrate the difficulty in distinguishing between anomalous members of the majority class and members of the target class, according to one embodiment.

Referring again to FIG. 1A, the dynamic targeted anomaly detection system 112 is initially trained to identify typical members of the majority class, according to one embodiment. In particular, the dynamic targeted anomaly detection system 112 trains the autoencoder 114 to identify typical members of the majority class, or members of the majority class that have characteristics expected of the majority class.

In one embodiment, the autoencoder 114 includes an encoding neural network 116 and a decoding neural network 118. The encoding neural network 116 is an encoder. The decoding neural network 118 is a decoder. The dynamic targeted anomaly detection system 112 trains the encoding neural network 116 and the decoding neural network 118 to cooperate together to identify typical members of the majority class.

In one embodiment, during training, the autoencoder 114 receives training set data 130. The training set data 130 includes a plurality of training data profiles. Each training data profile has characteristics that correspond to expected characteristics of typical members of the majority class. Thus, the autoencoder 114 is trained with training set data 130 populated with members of the majority class, or data profiles having characteristics known to correspond to members of the majority class. This helps to train the autoencoder 114 to identify members of the majority class, according to one embodiment.

In one embodiment, each data profile of the training set data 130 includes one or more feature vectors having a relatively high number of data fields. Each data field includes a data value. The data values in the data fields correspond to the characteristics of the data profile. Thus, each data profile is represented by one or more vectors, according to one embodiment.

In one embodiment, the dynamic targeted anomaly detection system 112 is implemented in a financial management system. The financial management system enables users to link their credit cards and bank accounts to the financial management system so that the financial management system can gather data related to the various financial transactions of the users. In one embodiment, each data profile corresponds to interactions of a user with the financial management system, or financial transactions of the user. In one embodiment, each data profile corresponds to interactions that the financial management has with a particular IP address. In one embodiment, each vector corresponds to an interaction of a user or IP address with the financial management system. In one embodiment, a single data profile includes multiple interactions of the user or IP address with the financial management system. Accordingly, in one embodiment, a single data profile includes multiple vectors.

Interactions with the financial management system include one or more of creation of an account with the financial management system, a login to the financial management system, linking of a financial account to the financial management system, linking of a credit card to the financial management system, occurrence of a financial transaction associated with a user, a failed login attempt, a failed attempt to link a financial account to the data management system, a failed attempt to link a credit card to the data management system, and many other kinds of financial transactions, according to various embodiments. The financial management system stores various data related to each interaction. In one embodiment, the data related to each interaction includes data identifying a type of the interaction, a time of the interaction, a date of the interaction, a monetary value of the interaction, success or failure of the interaction, a financial institution associated with the interaction, a credit card associated with the interaction, a vendor associated with the interaction, a location associated with the interaction, or other data that identifies characteristics of the interaction.

In various embodiments, because each interaction with the financial management system can have a large number of types of characteristics, each vector that corresponds to an interaction includes dozens, hundreds, or thousands of data fields. In one embodiment, many of the data fields for a vector associated with a given interaction with the financial management system contain a large number of zero values or empty data fields because many of the data fields are not pertinent to the particular type of interaction associated with the vector.

In various embodiments, a single data profile includes dozens, hundreds, or thousands of individual interactions with the financial management system. Accordingly, in various embodiments, a single data profile includes dozens, hundreds, or thousands of vectors. In one embodiment, a data profile includes a matrix made up of the various feature vectors associated with the interactions with the financial management system. In one embodiment, a data profile includes a matrix with rows and columns corresponding to the length of the vectors and the number of vectors.

In the example in which the dynamic targeted anomaly detection system 112 is implemented in a financial management system, the members of the majority class correspond to legitimate users of the financial management system, according to one embodiment. The members of the target class correspond to fraudulent users of the financial management system, according to one embodiment. The training set data 130 includes training data profiles that correspond to known legitimate users of the financial management system having characteristics that are expected of typical legitimate users of the financial management system, in one embodiment. In one embodiment, the training set data 130 includes training data profiles that corresponds to fabricated training data profiles having characteristics that are expected of typical legitimate users of the financial management system.

Returning to FIG. 1A, each training data profile of the training set data 130 is passed to the encoding neural network 116. The encoding neural network 116 receives each training data profile from the training set data 130. The encoding neural network 116 generates deconstructed training set data 132 including a deconstructed training data profile for each training data profile. The encoding neural network deconstructs the training data profiles and generates the deconstructed training set data 132 in accordance with parameters of the encoding neural network 116.

In one embodiment, each deconstructed training data profile is a compressed training data profile. The encoding neural network 116 deconstructs each training data profile by compressing each training data profile. Thus, in various embodiments, the deconstructed training data profile is compressed to include a reduced number of data fields. In an embodiment in which the training data profiles each include one or more vectors each having a certain number of data fields, the corresponding deconstructed training data profile includes one or more vectors each having far fewer data fields. In an embodiment in which the training data profiles each include a matrix with a certain number of rows and columns, the deconstructed training data profile includes a matrix with fewer numbers of rows and/or fewer numbers of columns.

In one embodiment, during the training process, the encoding neural network 116 passes deconstructed training set data 132 to the decoding neural network 118. The decoding neural network 118 is a deep neural network that receives the deconstructed training set data 132 and generates reconstructed training set data 134. The reconstructed training set data 134 includes a plurality of reconstructed training data profiles. Each reconstructed training data profile includes the same dimensions as the corresponding training data profile from the training set data 130. Each reconstructing training data is a reconstructed version of the training data profiles to which it corresponds.

In one embodiment, the autoencoder 114 trains the encoding neural network 116 and the decoding neural network 118, with a semi-supervised machine learning process, to generate reconstructed training set data 134 that matches the training set data 130. In one embodiment, the machine learning process is a deep learning process that compares the reconstructed training set data 134 to the training set data 130 each time that the autoencoder 114 generates the reconstructed training set data 134 in order to determine how closely the reconstructed training set data 134 matches the training set data 130. After each iteration of generating deconstructed training set data 132, generating reconstructed training set data 134, and comparing the reconstructed training set data 134 to the training set data 130, the machine learning process adjusts the parameters of the encoding neural network 116 and the decoding neural network 118 with the aim to eventually reliably generate reconstructed training set data 134 matches the training set data 130. When the autoencoder 114 is able to reliably generate reconstructed training set data 134 that matches the training set data 130 within a selected tolerance, the training of the autoencoder 114 is complete.

In one embodiment, because the autoencoder 114 is trained using training set data that includes training data profiles having characteristics corresponding to expected characteristics of typical majority class members, when the autoencoder 114 receives profile data that has characteristics expected of typical members of the majority class, the autoencoder 114 generates reconstructed profile data that matches the profile data within a selected tolerance. Correspondingly, if the autoencoder 114 receives profile data that does not have characteristics expected of typical members of the majority class, the autoencoder 114 does not generate reconstructed profile data that matches the profile data, according to one embodiment. In one embodiment, because the autoencoder 114 is trained to reconstruct data profiles that have characteristics expected of typical members of the majority class, the trained autoencoder 114 is a filter that is used to filter data profiles that corresponds to typical members of the majority class so that further analysis to distinguish between anomalous members of the majority class and members of the target class is performed only on data profiles that do not correspond to typical members of the majority class. The trained autoencoder 114 is now ready to participate in the process of distinguishing anomalous members of the majority class from members of the target class by filtering out typical members of the majority class, according to one embodiment.

In one embodiment, the dynamic targeted anomaly detection system 112 trains the classifier 120 to distinguish between anomalous members of the majority class and the expected class. The classifier 120 includes a deep neural network. The dynamic targeted anomaly detection system 112 trains the classifier 120, according to a fully supervised machine learning process to classify data profiles as either anomalous members of the majority class or members of the target class, according to one embodiment.

In one embodiment, the dynamic targeted anomaly detection system 112 trains the classifier 120 by passing compressed training set data 132 to the classifier 120. In particular, when training the classifier 120, the dynamic targeted anomaly detection system 112 provides training set data 130 to the autoencoder 114. This time, the training set data 130 includes training data profiles that are known as either anomalous members of the majority class or members of the target class. The classification of each individual data profile included in the training set data 130 is known to the dynamic targeted anomaly detection system 112. The autoencoder 114 generates deconstructed training set data 132 from the training set data 130. The deconstructed training set data 132 includes a deconstructed training data profile for each training data profile in the training set data 130. The autoencoder 114 passes the deconstructed training set data 132 to the classifier 120.

In one embodiment, the classifier 120 receives the deconstructed training set data 132 from the autoencoder 114. The classifier 120 includes a deep neural network that receives the deconstructed training set data 132 and generates training set classification data 136 for each deconstructed training data profile in the training set data 132. The training set classification data 136 identifies whether the training set data profile is an anomalous member of the majority class or a member of the target class.

In one embodiment, while the dynamic targeted anomaly detection system 112 trains the classifier 120, each time the classifier 120 generates training set classification data 136, the dynamic targeted anomaly detection system 112 compares the training set classification data 136 to the known classification of the training data profile for which the training set classification data 136 is generated.

In one embodiment, the dynamic targeted anomaly detection system 112 utilizes a deep machine learning process to train the classifier 120 to correctly classify the deconstructed training set data 132. In accordance with the machine learning process, the dynamic targeted anomaly detection system 112 adjusts the parameters of the classifier 120 each time the classifier 120 generates training set classification data 136. The machine learning process continues until the classifier 120 is able to reliably classify each training data profile from the training set data 130 correctly.

In one embodiment, during the training process, the classifier 120 generates the training set classification data 136 in the form of a probability that the training data profile belongs to a particular classification. The dynamic targeted anomaly detection system 112 utilizes the machine learning process to train the classifier 120 to correctly predict the classification for each training profile data beyond a threshold probability. In various embodiments the threshold probability is greater than 90%, greater than 95%, or greater than 99%.

In one embodiment, the classifier 120 generates training set classification data 136 having a number of bits that corresponds to the number of possible classifications. If the classifier 120 is configured to classify each training data profile as either belonging to the target class or as being an anomalous member of the majority class, then the training set classification data 136 includes a single bit, with the value of the bit indicating the classification of the training data profile, according to one embodiment.

In one embodiment, the classifier 120 is configured to assign classifications between more than two possible classes. For example, in one embodiment the classifier 120 is configured to assign training data profiles to one of multiple subclasses of anomalous majority members or to one of multiple subclasses of the target class. The classifier 120 returns the training set classification data 136 with a number of bits based on the number of possible classifications that the classifier 120 can return, according to one embodiment.

In one embodiment, when the machine learning process has trained of the classifier 120 to correctly classify the training set data 130 beyond a threshold tolerance, then the training process for the classifier 120 is complete. When the dynamic targeted anomaly detection system 112 has trained both the autoencoder 114 and the classifier 120, the training process for the dynamic targeted anomaly detection system 112 is complete, according to one embodiment.

Figure 2B:
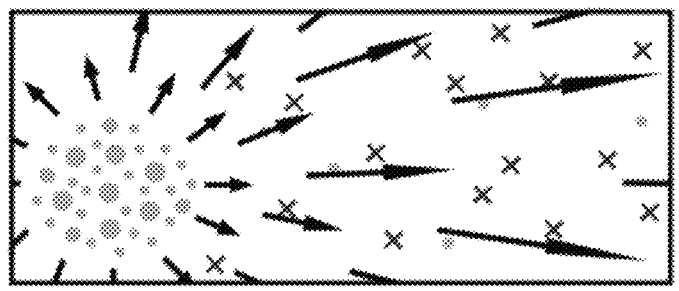
FIG. 2B is an illustration of stretching of the distribution space of FIG. 2A around the distribution of typical members of the majority class, according to one embodiment.

FIG. 2B is a simplified representation of stretching of the distribution space depicted in FIG. 2A as the main cluster of majority class members is removed from the distribution by action of the autoencoder 114, according to one embodiment. The direction of the arrows indicates the direction of stretching. The length of the arrows indicates the magnitude of the stretching. The stretching is more pronounced as distance from the expected majority class cluster increases.

Figure 2C:
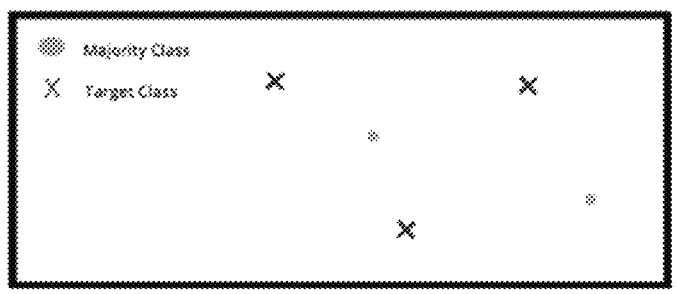
FIG. 2C is an illustration of a distribution of members of a majority class and of a target class in the stretched distribution space of FIG. 2B, according to one embodiment.

FIG. 2C represents a portion of the distribution space of FIG. 2A after the expected majority cluster has been filtered and the stretching of the distribution space has occurred, according to one embodiment. The distance between the anomalous members of the majority class and members of the target class has increased.

Figure 2D:
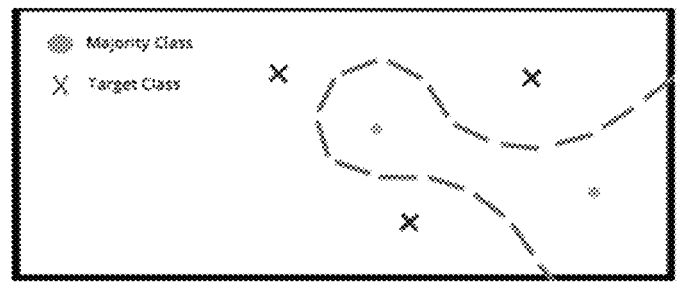
FIG. 2D is an illustration of a distribution of members of a majority class and of a target class in the stretched distribution space of FIG. 2B, according to one embodiment.

FIG. 2D represents the portion of the distribution space of FIG. 2C with a dashed line representing how the classifier 120 has been trained to differentiate between majority class anomalies and the target class in the distribution space, according to one embodiment. The task of distinguishing between majority class anomalies in the target class is significantly less complex due to the expansion of the distribution space and the removal of the expected majority class distribution, according to one embodiment.

FIG. 1B is a block diagram of the dynamic targeted anomaly detection system 112 during a process of the dynamic targeted anomaly detection system 112 for distinguishing between anomalous members of the majority class and members of the target class, according to one embodiment. With reference to FIG. 1A, the description of FIG. 1A, FIGS. 2A-2B, and FIG. 1B, with the autoencoder 114 and the classifier 120 trained in accordance with the description of FIG. 1A, the dynamic targeted anomaly detection system 112 is able to distinguish between anomalous members of the majority class and members of the target class, according to one embodiment.

In one embodiment, the dynamic targeted anomaly detection system 112 receives user profile data 140. The dynamic targeted anomaly detection system 112 is configured to classify the user profile data 140, according to one embodiment. In the description of FIG. 1B, the dynamic targeted anomaly detection system 112 classifies users as typical members of a majority class, anomalous members of the majority class, or members of the target class. However, in one embodiment, the term "users" can refer to individuals, IP addresses, data objects, or other entities to be classified as belonging to a majority group or a target group. The description of FIG. 1A set forth an example in which the training data profiles correspond to users of a data management system. Likewise, in one embodiment, the user profile data 140 corresponds to data characterizing interactions of a user with a data management system. In one embodiment, the user profile data 140 includes a vector having a particular length. In one embodiment, the user profile data 140 includes a combination of vectors having particular lengths. In one embodiment, the user profile data 140 includes matrices with particular numbers of rows and columns. In various embodiments, the user profile data 140 includes a data profile corresponding to one of the various possible forms set forth for the training data profiles in FIG. 1A.

In one embodiment, when user profile data 140 is provided to the dynamic targeted anomaly detection system 112 for classification, the autoencoder 114 receives the user profile data 140. The user profile data 140 is passed to the encoding neural network 116. The encoding neural network 116 generates deconstructed user profile data 142 from the user profile data 140 in accordance with processes set forth in relation to FIG. 1A for generating deconstructed training data profiles. In one embodiment, the deconstructed user profile data 142 is generated by compressing the user profile data 140, as described in relation to FIG. 1A.

In one embodiment, after the encoding neural network 116 has generated the deconstructed user profile data 142, the deconstructed user profile data 142 is passed to the decoding neural network 118. The decoding neural network 118 receives the deconstructed user profile data 142 and generates reconstructed user profile data 144. The reconstructed user profile data 144 has the same dimensions as the user profile data 140.

In one embodiment, because the autoencoder 114 has been trained to accurately reconstruct data profiles that have characteristics expected of typical members of the majority class, if the user profile data 140 has characteristics typical of the majority class, then the decoding neural network 118 will generate reconstructed user profile data 140 for that accurately matches the user profile data 140. However, if the user profile data 140 does not have characteristics corresponding to expected characteristics of typical members of the majority class, then the reconstructed user profile data 144 will not match the user profile data 140.

In one embodiment, the autoencoder 114 acts as a filter to filter out from further testing data profiles that corresponds to typical members of the majority class. Data profiles that do not correspond to typical members of the majority class are retained for classification as either anomalous members of the majority class or members of the target class. Thus, each time the user profile data 140 is passed through the autoencoder 114, the autoencoder 114 generates corresponding reconstructed user profile data 144 and compares the reconstructed user profile data 144 to the user profile data 140. If the reconstructed user profile data 144 matches the user profile data 140 within a tolerance, the user profile data 140 is untrusted to correspond to a typical member of the majority class and is filtered out from further testing. If the comparison indicates that the reconstructed user profile data 144 does not match the user profile data 140 within the threshold tolerance, then the user profile data 140, or the deconstructed user profile data generated from the user profile data 140, is retained for classification by the classifier 120.

In one embodiment, the classifier 120 receives the deconstructed user profile data 142 from the autoencoder 114 for those user profiles that the autoencoder 114 has determined do not correspond to typical members of the majority class. The deconstructed user profile data 142 is passed through the neural network of the classifier 120. The classifier 120 generates user profile classification data 146 classifying the user as either an anomalous member of the majority class for a member of the target class. In one embodiment, because the dynamic targeted anomaly detection system 112 has trained the classifier 120 with a machine learning process to accurately classify the deconstructed user profile data 142 as either a member of the target class or as an anomalous member of the majority class, the user profile classification data 146 accurately assigns the user profile to the correct classification.

In one embodiment, the classifier 120 generates user profile classification data 146 having a number of bits that corresponds to the number of possible classifications. If the classifier 120 is configured to classify each user data profile as either belonging to the target class or as being an anomalous member of the majority class, then the user profile classification data 146 includes a single bit, with the value of the bit indicating the classification of the user profile, according to one embodiment.

In one embodiment, the classifier 120 is configured to assign classifications between more than two possible classes. For example, in one embodiment the classifier 120 is configured to assign user profiles to one of multiple subclasses of anomalous majority members or to one of multiple subclasses of the target class. The classifier 120 returns the training set classification data 136 with a number of bits based on the number of possible classifications that the classifier 120 can return, according to one embodiment.

Figure 3:
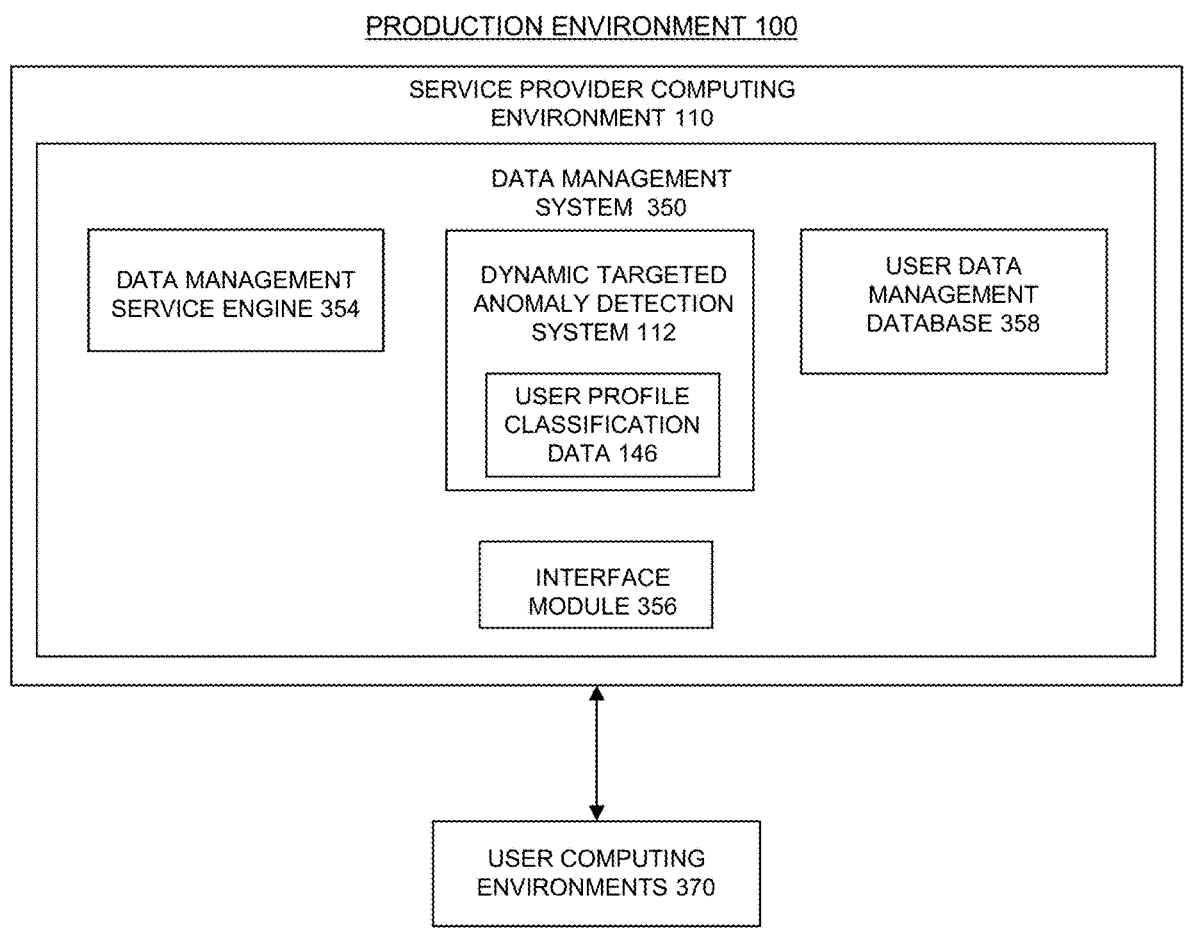
FIG. 3 is a block diagram of software architecture for efficiently and accurately distinguishing between anomalous members of a majority class and members of a target minority class, in accordance with one embodiment.

FIG. 3 is a block diagram of the production environment 100 of FIGS. 1A, 1B for efficiently and accurately distinguishing between anomalous members of a majority class and members of a target minority class, including a data management system 350 implemented in the service provider computing environment 110, according to one embodiment.

With reference to FIG. 1A, FIG. 1B the descriptions of FIGS. 1A and 1B, FIGS. 2A-2D, the descriptions of FIGS. 2A-2D, and FIG. 3, in one embodiment, the data management system 350 provides data management services to users of the data management system 350. The data management system includes a data management service engine 354, and interface module 356, a user data management database 358, and a dynamic targeted anomaly detection system 112, according to various embodiments. In one embodiment, the data management system 350 enables users to access the data management system 350 from user computing environments 370.

In one embodiment, the user interface module 356 communicates with the user computing environment 370 to enable users to access the data management system 350 to obtain data management services.

In one embodiment, the data management service engine 354 provides data management services to the users. Users can upload, download, and otherwise manage their personal data via the data management service engine 354.

In one embodiment, the user data management database 358 stores data management data related to the users. The user data management database 358 stores data related to interactions of the users with the data management system 350. The user data management database 358 also stores personal data of the users, according to one embodiment.

In one embodiment, the data management system 350 utilizes the dynamic anomaly targeted detection system 112 to distinguish between anomalous benign members of the majority class and members of the target class. In one embodiment, the target class is fraudulent users. The dynamic anomaly targeted detection system 112 receives user profile data from the user data management database 358 and generates user profile classification data 146 classifying the user profile data as set forth in relation to FIG. 1A and FIG. 1B above, according to one embodiment.

In one embodiment, the data management system 350 is a financial management system. The financial management system enables users to link their credit cards and bank accounts to the financial management system so that the financial management system can gather data related to the various financial transactions of the users. In one embodiment, each data profile corresponds to interactions of a user with the financial management system, or financial transactions of the user. In one embodiment, each data profile corresponds to interactions that the financial management has with a particular IP address. In one embodiment, each vector corresponds to an interaction of a user or IP address with the financial management system. In one embodiment, a single data profile includes multiple interactions of the user or IP address with the financial management system. Accordingly, in one embodiment, a single data profile includes multiple vectors.

Interactions with the financial management system include one or more of creation of an account with the financial management system, a login to the financial management system, linking of a financial account to the financial management system, linking of a credit card to the financial management system, occurrence of a financial transaction associated with a user, a failed login attempt, a failed attempt to link a financial account to the data management system, a failed attempt to link a credit card to the data management system, and many other kinds of financial transactions, according to various embodiments. The financial management system stores various data related to each interaction. In one embodiment, the data related to each interaction includes data identifying a type of the interaction, a time of the interaction, a date of the interaction, a monetary value of the interaction, success or failure of the interaction, a financial institution associated with the interaction, a credit card associated with the interaction, a vendor associated with the interaction, a location associated with the interaction, and any other data that identifies characteristics of the interaction.

In various embodiments, because each interaction with the financial management system can have a large number of types of characteristics, each vector that corresponds to an interaction can include dozens, hundreds, or thousands of data fields. In one embodiment, many of the data fields for vector associated with a given interaction with the financial management system contain a large number of zero values or empty data fields because many of the data fields are not pertinent to the particular type of interaction associated with the vector.

In various embodiments, a single data profile includes dozens, hundreds, or thousands of individual interactions with the financial management system. Accordingly, in various embodiments, a single data profile includes dozens, hundreds, or thousands of vectors. Accordingly, in one embodiment, a data profile includes a matrix made up of the various vectors associated with the interactions with the financial management system. In one embodiment, a data profile includes a matrix with dimensions corresponding to the length of the vectors by the number of vectors.

In the example in which the dynamic targeted anomaly detection system 112 is implemented in a financial management system, the members of the majority class correspond to legitimate users of the financial management system. The members of the target class correspond to fraudulent users of the financial management system.

With reference to FIGS. 1A-3 and their descriptions, consider an example in which a user registers an account with a financial management system. In one embodiment, the autoencoder 114 is a neural network characterized by lower dimensional representations at an intermediate layer. The intermediate layer is a sort of bottleneck through which tensors must squeeze as they flow through the network. In place of traditional labels, the autoencoder uses ground truth input as supervision, and optimizes for exact reconstruction of the input vector. The autoencoder 114 learns and optimal nonlinear compression and reconstruction scheme under dimensionality reduction constraints.

In one embodiment, the autoencoder 114 is a form of nonlinear principal component analysis (NLPCA) where the principal components are analogous to the activations at the intermediate layer—the latent space representation of the data.

In one embodiment, the dynamic targeted anomaly detection system 112 addresses anomaly detection in data sets plagued by skewed class sizes and concepts drift by presenting a semi-supervised autoencoder 114, trained to reconstruct majority class feature vectors by minimizing reconstruction error.

In one embodiment, the architecture of the dynamic targeted anomaly detection system 112 can effectively model any stationary digital terrain analysis data (DTAD) problem. The architecture is robust to skewed class sizes and to concept drift in the target class. The architecture offers highly effective in tunable expressiveness, and does not require manual labeling of target class samples, in one embodiment.

In one embodiment, during training of the autoencoder 114, feature vectors are supplied to the autoencoder 114 representing the set of all majority class data. This data is passed into the autoencoder. The autoencoder is trained to minimize the reconstruction error between the output vectors in the ground truth feature vectors for each sample in the set of majority class feature vectors. The autoencoder 114 learns the optimal mapping to the latent space, and back to the original space, thus yielding the most information rich latent space representation of majority class feature vectors. In this manner, the autoencoder learns wait mappings that best leverage the distribution of feature values belonging to majority class interactions. The compositional structure of the autoencoder network allows for hierarchical and fundamentally more complex modeling of majority class data, according to one embodiment.

In one embodiment, after the dynamic targeted anomaly detection system 112 has been trained, unseen static feature vectors are fed to the dynamic targeted anomaly detection system 112. For each feature vector, the autoencoder 114 generates an output vector in the same space as the input vector. The dynamic targeted anomaly detection system 112 and computes the reconstruction error between each sample's original distribution feature value distribution and is output feature value distribution. In this way, the model has been trained to effectively reconstruct majority class samples. Thus, reconstruction error for an unseen majority class samples are generally smaller than the reconstruction error for unseen target class examples in other words the autoencoder 114 is been trained to learn the distribution of majority class examples and distance from the distribution can be quantified as reconstruction error. Thus, never before seen samples, whose future value distribution differs greatly from the feature value distribution of majority class samples, have high reconstruction error. The dynamic targeted anomaly detection system 112 post processes the model outputs by ranking the corresponding samples in order of decreasing reconstruction error. Personnel associated with the dynamic targeted anomaly detection system 112 can manually inspect the top and samples of this set, where and is a parameter which can be tuned to business needs, according to one embodiment.

In one embodiment, another benefit of the semi-supervised approach is that the dynamic targeted anomaly detection system 112 does not require manual labeling of target class transactions, a costly and often imperfect practice. Note that the reconstruction error loss function offers flexibility, as it is fully tunable. The error metric can be tuned to any problem. The dynamic targeted anomaly detection system 112 can use cross entropy, Hellinger distance, or cosine similarity. Since loss is defined over feature values (rather than probabilities) the dynamic targeted anomaly detection system 112 has the flexibility to attribute relative importance to features of interest, without influencing the model's representation of those features, by weighting each index in the feature vector by its relative importance. This measure offers greater control over the model to the business units, without sacrificing in expressive power.

In one embodiment, the autoencoder 114 offers flexibility in that the encoder and decoder neural networks are black boxes, parameterizable by any neural network. Hence the dynamic targeted anomaly detection system 112 can parameterize the encoder and decoder with recurrent neural networks, if the aim is to learn representations of sequences. In one embodiment, at time t=i, the encoder long-term short-term memory (LSTM) is fed with elements i of the sequence. At each time step t, the LSTM encoder returns and output vector z in latent space. The latent vector at time t=T represents the entire sequence in latent space. The vector is no longer temporal. In fact, vector has no notion of sequence like. This latent vector z can be thought of as the temporal input sequences and bedding in and atemporal vector space Z. To reconstruct the sequence from this embedding, T copies are made of z (for a sequence of length T). In order to reconstruct the original input sequence, a copy of z is passed as input to the LSTM decoder at each time step.

In one embodiment, the dynamic targeted anomaly detection system 112 can implement multiple levels of hierarchy. By stacking multiple semi-supervised autoencoder 114, wherein the i-th autoencoder trains, that embeds the full training set, and the i+1-th autoencoder uses this embedded set as its own training set. The final autoencoder is reconstruction is then used as a filter. A finals supervised model is trained on the set of samples which pass through the filter. Alternatively, the dynamic targeted anomaly detection system 112 can filter iteratively at each level of depth with the corresponding filter at each hierarchy level.

In one embodiment, the dynamic targeted anomaly detection system 112 provides the ability to model alternatively shapen expected majority class distributions. The choice of reconstruction error presupposes some degree of knowledge regarding the shape of the distribution of expected majority class features that the dynamic targeted anomaly detection system 112 seeks to model. For example, mean squared error presupposes well defined first and second moments, and is most interpretable under Gaussian distribution assumptions. Accordingly, the dynamic targeted anomaly detection system 112 utilizes alternative distance metrics as reconstruction error metrics, which may capture varying measures of distance from the expected majority class we distributions. In various embodiments, metrics include Hellinger distance, Wasserstein distance (earth movers distance), and waited mean squared error (MSE) (attributes feature level-importances).

In one embodiment, the dynamic targeted anomaly detection system 112 provides the ability to generate synthetic data from expected majority class distribution, make stronger assumptions about the supervised model, and gain interpretability by being able to analyze the learn the manifold in Z. In one embodiment, a variational autoencoder is used as the semi-supervised autoencoder architecture. This allows the dynamic targeted anomaly detection system 112 to push the latent space representation toward a Gaussian distribution, and thus have stronger assumptions both about the data past to the model, be able to generate realistic synthetic data by passing a randomly sampled point from the surface of this manifold to the decoder, and gain interpretability of the manifold by analyzing its tangent space and thus gain a richer understanding of the distribution learned by the Autoencoder. In one embodiment, the autoencoder 114 draws the latent distribution towards that learned by running topological data analysis on the majority class. In this manner a more geometrically robust latent space representation is learned, and by doing so, the boundaries of the expected majority class distribution are more intelligently the marked. The space is also more intelligently stretched.

In one embodiment, the dynamic targeted anomaly detection system 112 is utilized to detect fraud in static data sets and in temporal data sets. In one embodiment, the dynamic targeted anomaly detection system 112 is used to detect outliers in tax form images with parameterization of convolutional neural network for image classification. In one embodiment, the dynamic targeted anomaly detection system 112 is used in clickstream behavioral anomaly detection by detecting abandonment from rare behavior and by detecting subscription from rare behavior. In one embodiment, the dynamic targeted anomaly detection system 112 is used in transaction categorization for identifying rare transactions.

Embodiments of the present disclosure overcome the drawbacks of traditional data management systems that are unable to distinguish between anomalous members of the majority class and members of the target class. Embodiments of the present disclosure overcome these drawbacks by providing a change neural network architecture that filters out the user data profiles that are typical of the majority class, and accurately and efficiently classifying the remaining user data profiles as either anomalous members of the majority class or members of the target class.

Figure 4:
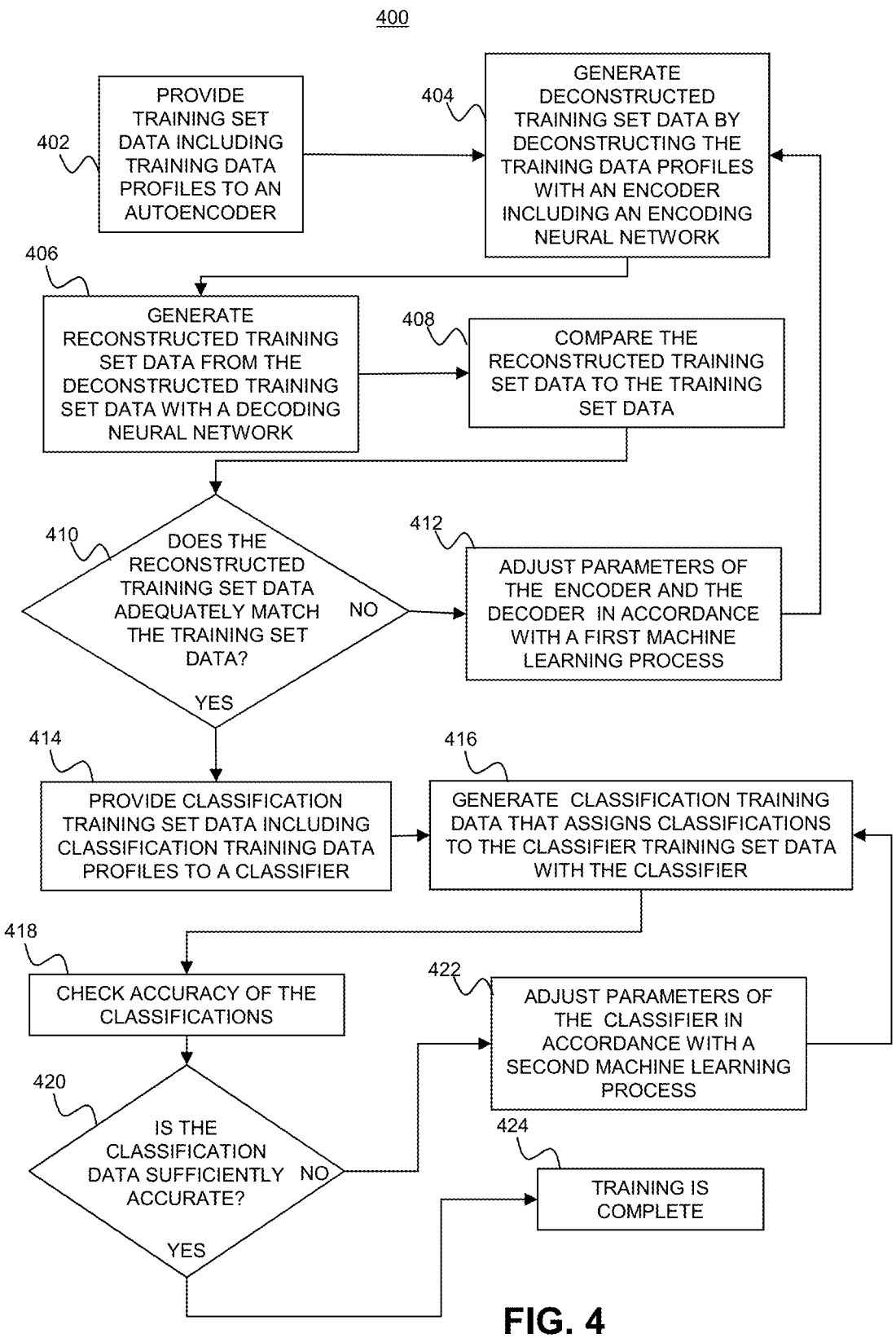
FIG. 4 is a functional flow diagram of a process for efficiently and accurately distinguishing between anomalous members of a majority class and members of a target minority class, in accordance with one embodiment.

FIG. 4 illustrates a functional flow diagram of a process 400 for efficiently and accurately distinguishing between anomalous members of a majority class and members of a target minority class, in accordance with various embodiments.

Referring to FIG. 4, FIGS. 1A-3, and the descriptions of FIGS. 1A-3 above, at block 402, training set data including training data profiles is provided to an autoencoder using any of the methods, processes, and procedures discussed above with respect to FIGS. 1A-3, according to one embodiment. From block 402 the process proceeds to block 404.

At block 404, deconstructed training set data is generated by deconstructing the training data profiles with an encoder including an encoding neural network using any of the methods, processes, and procedures discussed above with respect to FIGS. 1A-3, according to one embodiment. From block 404 the process proceeds to block 406.

At block 406, reconstructed training set data is generated from the deconstructed training set data with a decoding neural network using any of the methods, processes, and procedures discussed above with respect to FIGS. 1A-3, according to one embodiment. From block 406 the process proceeds to block 408.

At block 408 the reconstructed training set data is compared to the training set data using any of the methods, processes, and procedures discussed above with respect to FIGS. 1A-3, according to one embodiment. From block 408 the process proceeds to block 410.

At block 410 if the reconstructed training set data does not adequately match the training set data then the process proceeds to block 412, according to one embodiment.

At block 412 parameters of the encoder and the decoder are adjusted in accordance with a first machine learning process using any of the methods, processes, and procedures discussed above with respect to FIGS. 1A-3, according to one embodiment. From block 412 the process proceeds to block 404.

At block 410 if the reconstructed training set data adequately matches the training set data in the process proceeds to block 414, according to one embodiment.

At block 414, classification training set data including classification training data profiles is provided to a classifier using any of the methods, processes, and procedures discussed above with respect to FIGS. 1A-3, according to one embodiment. From block 414 the process proceeds to block 416.

At block 416, classification training data is generated assigning classifications to the classification training set data with the classifier using any of the methods, processes, and procedures discussed above with respect to FIGS. 1A-3, according to one embodiment. From block 416 the process proceeds to block 418.

At block 418 the accuracy of the classifications is checked using any of the methods, processes, and procedures discussed above with respect to FIGS. 1A-3, according to one embodiment. From block 418 the process proceeds to block 420.

At block 420 if the classification data is not sufficiently accurate then the process proceeds to block 422, according to one embodiment.

At block 422, parameters of the classifier are adjusted in accordance with a second machine learning process using any of the methods, processes, and procedures discussed above with respect to FIGS. 1A-3, according to one embodiment. From block 422 the process proceeds to block 416.

At block 420 if the classification data is sufficiently accurate then the process proceeds to block 424, according to one embodiment.

At block 424, training is complete, according to one embodiment.

Those of skill in the art will recognize, in light of the present disclosure, that the process 400 can include different steps, different orders of steps, and steps performed by modules other than those represented in FIG. 4.

Figure 5:
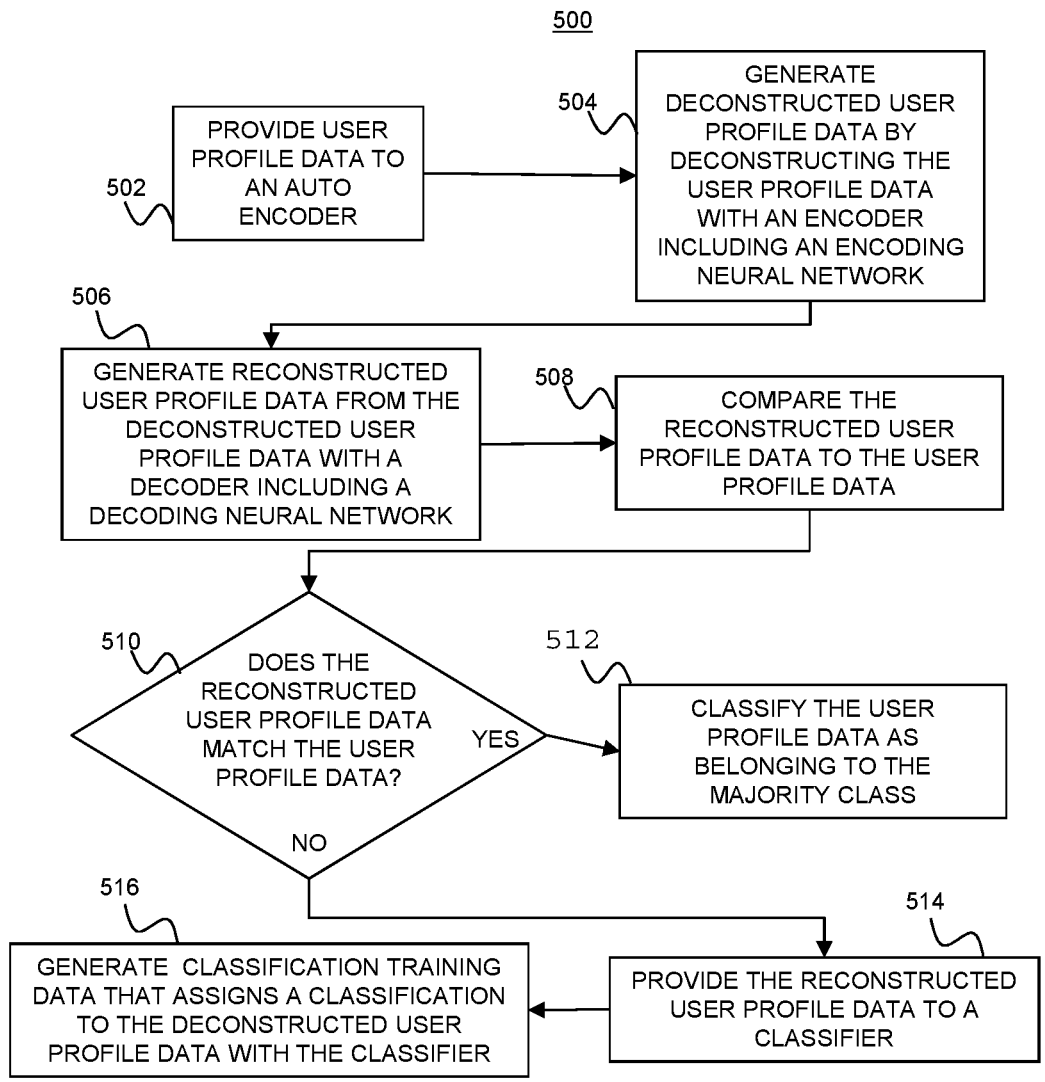
FIG. 5 is a functional flow diagram of a process for efficiently and accurately distinguishing between anomalous members of a majority class and members of a target minority class, in accordance with one embodiment.

Referring to FIG. 5, FIGS. 1A-3, and the descriptions of FIGS. 1A-3 above, at block 502, user profile data is provided to an autoencoder using any of the methods, processes, and procedures discussed above with respect to FIGS. 1A-3, according to one embodiment. From block 502 the process proceeds to block 504.

At block 504, deconstructed user profile data is generated by deconstructing the user profile data with an encoder including an encoding neural network using any of the methods, processes, and procedures discussed above with respect to FIGS. 1A-3, according to one embodiment. From block 504 the process proceeds to block 506.

At block 506 reconstructed user profile data is generated from the deconstructed user profile data with a decoding neural network using any of the methods, processes, and procedures discussed above with respect to FIGS. 1A-3, according to one embodiment. From block 506 the process proceeds to block 508.

At block 508 the reconstructed user profile data is compared to the user profile data using any of the methods, processes, and procedures discussed above with respect to FIGS. 1A-3, according to one embodiment. From block 508 the process proceeds to block 510.

At block 510 if the reconstructed user profile data matches the user profile data in the process proceeds to block 512.

At block 512 user profile data is classified as belonging to the majority class using any of the methods, processes, and procedures discussed above with respect to FIGS. 1A-3, according to one embodiment.

At block 510 if the reconstructed user profile data does not match the user profile data then the process proceeds to block 514.

At block 514, the reconstructed user profile data is provided to the classifier using any of the methods, processes, and procedures discussed above with respect to FIGS. 1A-3, according to one embodiment. From block 514 the process proceeds to block 516.

At block 516 classification training data that assigns a classification to the deconstructed user profile data is generated with the classifier using any of the methods, processes, and procedures discussed above with respect to FIGS. 1A-3, according to one embodiment.

Those of skill in the art will recognize, in light of the present disclosure, that the process 500 can include different steps, different orders of steps, and steps performed by modules other than those represented in FIG. 5.

Figure 6:
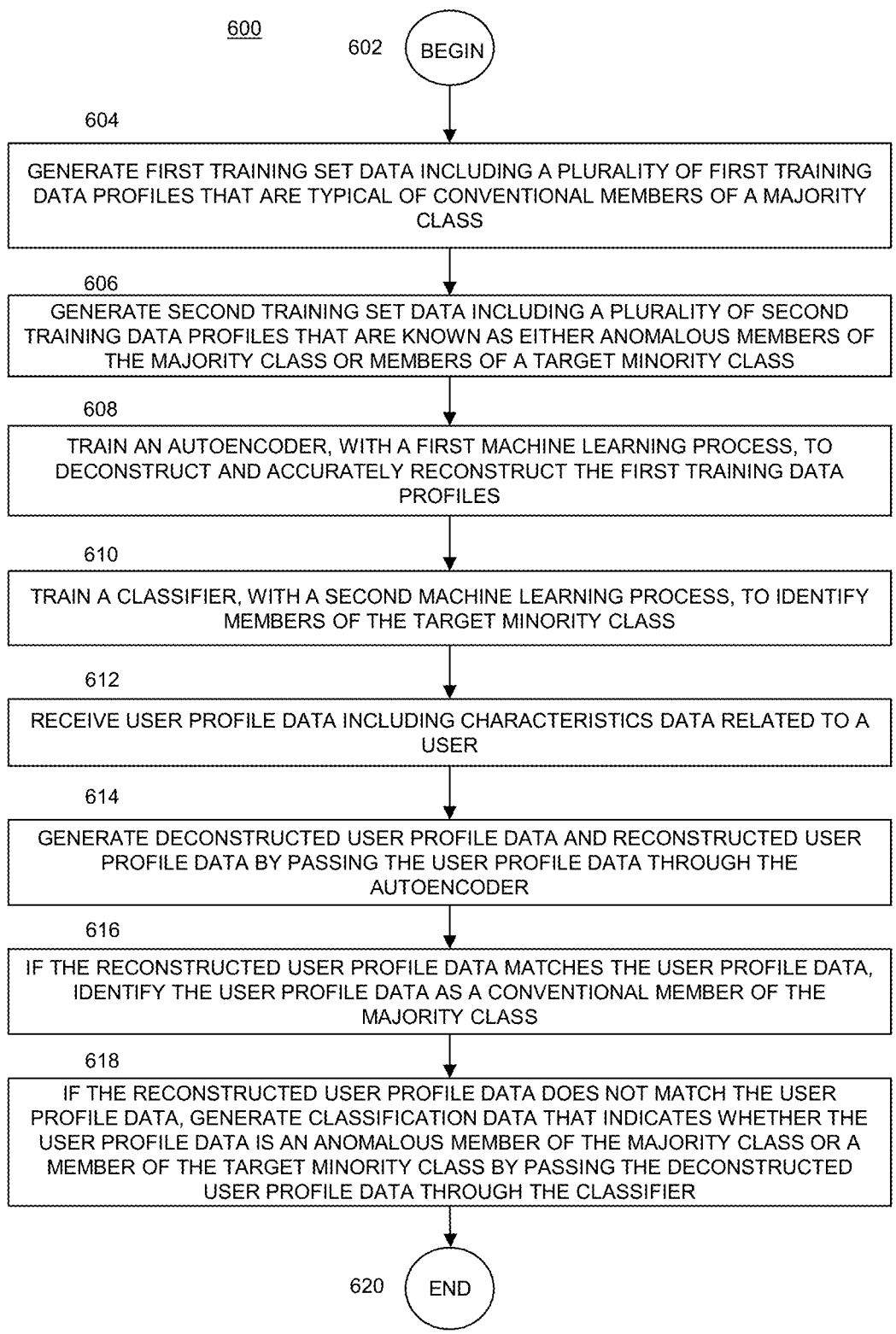
FIG. 6 is a flow diagram of a process for efficiently and accurately distinguishing between anomalous members of a majority class and members of a target minority class, in accordance with one embodiment.

FIG. 6 illustrates a flow diagram of a process 600 for efficiently and accurately distinguishing between anomalous members of a majority class and members of a target minority class, in various embodiments.

Referring to FIG. 6, FIGS. 1A-3, and the description of FIGS. 1A-3 above, in one embodiment, process 600 begins at BEGIN 602 and process flow proceeds to GENERATE FIRST TRAINING SET DATA INCLUDING A PLURALITY OF FIRST TRAINING DATA PROFILES THAT ARE TYPICAL OF CONVENTIONAL MEMBERS OF A MAJORITY CLASS 604.

In one embodiment, at GENERATE FIRST TRAINING SET DATA INCLUDING A PLURALITY OF FIRST TRAINING DATA PROFILES THAT ARE TYPICAL OF CONVENTIONAL MEMBERS OF A MAJORITY CLASS 604, first training set data is generated including a plurality of first training data profiles that are typical of conventional members of a majority class, using any of the methods, processes, and procedures discussed above with respect to FIGS. 1A-3.

In one embodiment, once first training set data is generated including a plurality of first training data profiles that are typical of conventional members of a majority class at GENERATE FIRST TRAINING SET DATA INCLUDING A PLURALITY OF FIRST TRAINING DATA PROFILES THAT ARE TYPICAL OF CONVENTIONAL MEMBERS OF A MAJORITY CLASS 604 process flow proceeds to GENERATE SECOND TRAINING SET DATA INCLUDING A PLURALITY OF SECOND TRAINING DATA PROFILES THAT ARE KNOWN AS EITHER ANOMALOUS MEMBERS OF THE MAJORITY CLASS OR MEMBERS OF A TARGET MINORITY CLASS 606.

In one embodiment, at GENERATE SECOND TRAINING SET DATA INCLUDING A PLURALITY OF SECOND TRAINING DATA PROFILES THAT ARE KNOWN AS EITHER ANOMALOUS MEMBERS OF THE MAJORITY CLASS OR MEMBERS OF A TARGET MINORITY CLASS 606, second training set data is generated including a plurality of second training data profiles that are known as either anomalous members of the majority class or members of a target minority class, using any of the methods, processes, and procedures discussed above with respect to FIGS. 1A-3.

In one embodiment, once second training set data is generated including a plurality of second training data profiles that are known as either anomalous members of the majority class or members of a target minority classat GENERATE SECOND TRAINING SET DATA INCLUDING A PLURALITY OF SECOND TRAINING DATA PROFILES THAT ARE KNOWN AS EITHER ANOMALOUS MEMBERS OF THE MAJORITY CLASS OR MEMBERS OF A TARGET MINORITY CLASS 606, process flow proceeds to TRAIN AN AUTOENCODER, WITH A FIRST MACHINE LEARNING PROCESS, TO DECONSTRUCT AND ACCURATELY RECONSTRUCT THE FIRST TRAINING DATA PROFILES 608.

In one embodiment, at TRAIN AN AUTOENCODER, WITH A FIRST MACHINE LEARNING PROCESS, TO DECONSTRUCT AND ACCURATELY RECONSTRUCT THE FIRST TRAINING DATA PROFILES 608, an autoencoder is trained, with a first machine learning process, to deconstruct and accurately reconstruct the first training data profiles, using any of the methods, processes, and procedures discussed above with respect to FIGS. 1A-3.

In one embodiment, once an autoencoder is trained, with a first machine learning process, to deconstruct and accurately reconstruct the first training data profiles at TRAIN AN AUTOENCODER, WITH A FIRST MACHINE LEARNING PROCESS, TO DECONSTRUCT AND ACCURATELY RECONSTRUCT THE FIRST TRAINING DATA PROFILES 608, process flow proceeds to TRAIN A CLASSIFIER, WITH A SECOND MACHINE LEARNING PROCESS, TO IDENTIFY MEMBERS OF THE TARGET MINORITY CLASS 610.

In one embodiment, at TRAIN A CLASSIFIER, WITH A SECOND MACHINE LEARNING PROCESS, TO IDENTIFY MEMBERS OF THE TARGET MINORITY CLASS 610, a classifier is trained, with a second machine learning process, to identify members of the target minority class, using any of the methods, processes, and procedures discussed above with respect to FIGS. 1A-3.

In one embodiment, once a classifier is trained, with a second machine learning process, to identify members of the target minority class at TRAIN A CLASSIFIER, WITH A SECOND MACHINE LEARNING PROCESS, TO IDENTIFY MEMBERS OF THE TARGET MINORITY CLASS 610, process flow proceeds to RECEIVE USER PROFILE DATA INCLUDING CHARACTERISTICS DATA RELATED TO A USER 612.

In one embodiment, at RECEIVE USER PROFILE DATA INCLUDING CHARACTERISTICS DATA RELATED TO A USER 612, user profile data is received including characteristics data related to a user, using any of the methods, processes, and procedures discussed above with respect to FIGS. 1A-3.

In one embodiment, once user profile data is received including characteristics data related to a user at RECEIVE USER PROFILE DATA INCLUDING CHARACTERISTICS DATA RELATED TO A USER 612, process flow proceeds to GENERATE DECONSTRUCTED USER PROFILE DATA AND RECONSTRUCTED USER PROFILE DATA BY PASSING THE USER PROFILE DATA THROUGH THE AUTOENCODER 614.

In one embodiment, at GENERATE DECONSTRUCTED USER PROFILE DATA AND RECONSTRUCTED USER PROFILE DATA BY PASSING THE USER PROFILE DATA THROUGH THE AUTOENCODER 614, deconstructed user profile data and reconstructed user profile data are generated by passing the user profile data through the autoencoder, using any of the methods, processes, and procedures discussed above with respect to FIGS. 1A-3.

In one embodiment, once deconstructed user profile data and reconstructed user profile data are generated by passing the user profile data through the autoencoder at GENERATE DECONSTRUCTED USER PROFILE DATA AND RECONSTRUCTED USER PROFILE DATA BY PASSING THE USER PROFILE DATA THROUGH THE AUTOENCODER 614, process flow proceeds to IF THE RECONSTRUCTED USER PROFILE DATA MATCHES THE USER PROFILE DATA, IDENTIFY THE USER PROFILE DATA AS A CONVENTIONAL MEMBER OF THE MAJORITY CLASS 616.

In one embodiment, at IF THE RECONSTRUCTED USER PROFILE DATA MATCHES THE USER PROFILE DATA, IDENTIFY THE USER PROFILE DATA AS A CONVENTIONAL MEMBER OF THE MAJORITY CLASS 616, the user profile data is identified as a conventional member of the majority class if the reconstructed user profile data matches the user profile data, using any of the methods, processes, and procedures discussed above with respect to FIGS. 1A-3.

In one embodiment, once the user profile data is identified as a conventional member of the majority class if the reconstructed user profile data matches the user profile data at IF THE RECONSTRUCTED USER PROFILE DATA MATCHES THE USER PROFILE DATA, IDENTIFY THE USER PROFILE DATA AS A CONVENTIONAL MEMBER OF THE MAJORITY CLASS 616, process flow proceeds to IF THE RECONSTRUCTED USER PROFILE DATA DOES NOT MATCH THE USER PROFILE DATA, GENERATE CLASSIFICATION DATA THAT INDICATES WHETHER THE USER PROFILE DATA IS AN ANOMALOUS MEMBER OF THE MAJORITY CLASS OR A MEMBER OF THE TARGET MINORITY CLASS BY PASSING THE DECONSTRUCTED USER PROFILE DATA THROUGH THE CLASSIFIER 618.

In one embodiment, at IF THE RECONSTRUCTED USER PROFILE DATA DOES NOT MATCH THE USER PROFILE DATA, GENERATE CLASSIFICATION DATA THAT INDICATES WHETHER THE USER PROFILE DATA IS AN ANOMALOUS MEMBER OF THE MAJORITY CLASS OR A MEMBER OF THE TARGET MINORITY CLASS BY PASSING THE DECONSTRUCTED USER PROFILE DATA THROUGH THE CLASSIFIER 618, classification data is generated that indicates whether the user profile data is an anomalous member of the majority class or a member of the target minority class by passing the deconstructed user profile data through the classifier if the reconstructed user profile data does not match the user profile data, using any of the methods, processes, and procedures discussed above with respect to FIGS. 1A-3.

In one embodiment, once classification data is generated that indicates whether the user profile data is an anomalous member of the majority class or a member of the target minority class by passing the deconstructed user profile data through the classifier if the reconstructed user profile data does not match the user profile data at IF THE RECONSTRUCTED USER PROFILE DATA DOES NOT MATCH THE USER PROFILE DATA, GENERATE CLASSIFICATION DATA THAT INDICATES WHETHER THE USER PROFILE DATA IS AN ANOMALOUS MEMBER OF THE MAJORITY CLASS OR A MEMBER OF THE TARGET MINORITY CLASS BY PASSING THE DECONSTRUCTED USER PROFILE DATA THROUGH THE CLASSIFIER 618, process flow proceeds to END 620.

In one embodiment, at END 620 the process 600 for efficiently and accurately distinguishing between anomalous members of a majority class and members of a target minority class is exited to await new data and/or instructions.

As noted, the specific illustrative examples discussed above are but illustrative examples of implementations of embodiments of the method or process for efficiently and accurately distinguishing between anomalous members of a majority class and members of a target minority class. Those of skill in the art will readily recognize that other implementations and embodiments are possible. Therefore, the discussion above should not be construed as a limitation on the claims provided below.

In one embodiment, a system for efficiently and accurately distinguishing between anomalous members of a majority class and members of a minority class includes at least one processor and at least one memory coupled to the at least one processor. The at least one memory has stored therein instructions which, when executed by any set of the one or more processors, perform a process including receiving user profile data with an autoencoder including an encoder and a decoder and generating deconstructed user profile data from the user profile data with the encoder. The process includes generating reconstructed user profile data from the deconstructed user profile data with the decoder and if the reconstructed user profile data matches the user profile data, identifying the user profile data as a conventional member of the majority class. The process includes, if the reconstructed user profile data does not match the user profile data, generating class identification data that indicates whether the user profile data corresponds to an anomalous member of the majority class or a member of the target minority class by passing the deconstructed user profile data through a classifier neural network.

In one embodiment, a system for efficiently and accurately distinguishing between anomalous members of a majority class and members of a minority class includes at least one processor and at least one memory coupled to the at least one processor. The at least one memory has stored therein instructions which, when executed by any set of the one or more processors, perform a process including generating first training set data including a plurality of first training data profiles that are typical of conventional members of a majority class and generating second training set data including a plurality of second training data profiles that are known as either anomalous members of the majority class or members of a target minority class. The process includes training an autoencoder, with a first machine learning process, to deconstruct and accurately reconstruct the first training data profiles and training a classifier, with a second machine learning process, to identify members of the target minority class. The process includes receiving user profile data including characteristics data related to a user and generating deconstructed user profile data and reconstructed user profile data by passing the user profile data through the autoencoder. The process includes, if the reconstructed user profile data matches the user profile data, identifying the user profile data as a conventional member of the majority class. The process includes, if the reconstructed user profile data does not match the user profile data, generating classification data that indicates whether the user profile data is an anomalous member of the majority class or a member of the target minority class by passing the deconstructed user profile data through the classifier.

In one embodiment a method for efficiently and accurately distinguishing between anomalous members of a majority class and members of a target minority class includes generating first training set data including a plurality of first training data profiles that are typical of conventional members of a majority class and generating second training set data including a plurality of second training data profiles that are known as either anomalous members of the majority class or members of a target minority class. The method includes training an autoencoder, with a first machine learning process, to deconstruct and accurately reconstruct the first training data profiles and training a classifier, with a second machine learning process, to identify members of the target minority class. The method includes receiving user profile data including characteristics data related to a user. The method includes generating deconstructed user profile data and reconstructed user profile data by passing the user profile data through the autoencoder and, if the reconstructed user profile data matches the user profile data, identifying the user profile data as a conventional member of the majority class. The method includes, if the reconstructed user profile data does not match the user profile data, generating classification data that indicates whether the user profile data is an anomalous member of the majority class or a member of the target minority class by passing the deconstructed user profile data through the classifier.

In one embodiment a method for efficiently and accurately distinguishing between anomalous members of a majority class and members of a target minority class includes generating first training set data including a plurality of first training data profiles that are typical of conventional members of a majority class and training an autoencoder, with a first machine learning process, to deconstruct and accurately reconstruct the first training data profiles. The method includes providing second training set data to the autoencoder including second training data profiles that are known as either anomalous members of the majority class or members of a target minority class. The method includes generating, with the autoencoder, deconstructed second training set data from the second training set data and providing the deconstructed second training set data from the autoencoder to a classifier. The method includes training the classifier, with a second machine learning process, to classify the second training data profiles corresponding to the deconstructed second training set data as either anomalous members of the majority class or as members of the target minority class.

In the discussion above, certain aspects of one embodiment include process steps, operations, or instructions described herein for illustrative purposes in a particular order or grouping. However, the particular orders or groupings shown and discussed herein are illustrative only and not limiting. Those of skill in the art will recognize that other orders or groupings of the process steps, operations, and instructions are possible and, in some embodiments, one or more of the process steps, operations and instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

As discussed in more detail above, using the above embodiments, with little or no modification or input, there is considerable flexibility, adaptability, and opportunity for customization to meet the specific needs of various parties under numerous circumstances.

In the discussion above, certain aspects of one embodiment include process steps, operations, or instructions described herein for illustrative purposes in a particular order or grouping. However, the particular order or grouping shown and discussed herein are illustrative only and not limiting. Those of skill in the art will recognize that other orders and groupings of the process steps, operations, or instructions are possible and, in some embodiments, one or more of the process steps, operations, or instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or another device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for training an autoencoder and a classifier to efficiently and accurately distinguish between anomalous members of a majority class and members of a target minority class, the method comprising:
   generating first training set data including a plurality of first training data profiles that are typical of conventional members of the majority class;
   generating second training set data including a plurality of second training data profiles, the second training set data including data profiles that are known as anomalous members of the majority class or members of the target minority class, and the second training set data not including data profiles that are typical of conventional members of the majority class;
   training the autoencoder, with a first machine learning process, to deconstruct and accurately reconstruct the first training data profiles, wherein the autoencoder includes an encoding neural network and a decoding neural network, and wherein training the autoencoder with the first machine learning process includes:
      receiving a set of user profile data including characteristics data related to a user;
      generating, using the encoding neural network, deconstructed user profile data from the set of user profile data;
      generating, using the decoding neural network, reconstructed user profile data from the deconstructed user profile data; and
      iteratively adjusting parameters of the encoding and decoding neural networks until the reconstructed training data profiles match the first training data profiles within a threshold tolerance; and
   training the classifier, with a second machine learning process based at least in part on the second training set data, to identify members of the target minority class, wherein the classifier includes a third neural network, and wherein training the classifier with the second machine learning process includes:
      receiving reconstructed user profile data from the trained autoencoder;
      selectively classifying user profile data corresponding to the reconstructed user profile data as an anomalous member of the majority class or a member of the target minority class based on whether the corresponding reconstructed user profile data matches the user profile data, the selective classifying including:
         refraining from classifying the user profile data as an anomalous member of the majority class or a member of the target minority class responsive to determining that the reconstructed user profile data matches the user profile data; and
         classifying, with the classifier, the user profile data as an anomalous member of the majority class or a member of the target minority class responsive to determining that the reconstructed user profile data does not match the user profile data; and
      iteratively adjusting parameters of the third neural network until an accuracy of the selective classification is greater than a threshold accuracy.

2. The method of claim 1, wherein training the autoencoder includes receiving the first training data profiles with the encoding neural network and generating deconstructed first training data profiles by deconstructing the first training data profiles.

3. The method of claim 2, wherein training the autoencoder includes receiving the deconstructed first training data profiles with the decoding neural network and generating reconstructed training data profiles by reconstructing the deconstructed first training data profiles.

4. The method of claim 3, wherein deconstructing the first training data profiles includes compressing the first training data profiles.

5. The method of claim 4, wherein the reconstruction of the first training data profiles includes decompressing the first training data profiles.

6. The method of claim 3, wherein the deconstructed first training data profiles include fewer data elements than the first training data profiles.

7. The method of claim 6, wherein the first machine learning process includes iteratively adjusting the parameters of the encoding and decoding neural networks in generating the reconstructed first training data profiles until the decoding neural network generates the reconstructed first training data profiles that match the first training data profiles within a selected tolerance.

8. The method of claim 3, wherein the second machine learning process includes generating target class identification training data indicating a probability that the second training data profiles belong in the target minority class.

9. The method of claim 8, wherein the second machine learning process includes iteratively adjusting the parameters of the third neural network until the probability is within a threshold probability of correctly identifying whether the second training data profiles belong in the target minority class.

10. The method of claim 1, wherein each user profile data includes interactions of a respective user with a data management system.

11. The method of claim 10, wherein the data management system is a financial management system.

12. The method of claim 11, wherein the user profile data indicates at least one of an IP address of the user, creation of an account with the data management system, entering of credit card data to the data management system, incorrect entering of credit card data to the data management system, financial transactions of the user with the data management system, or linking a bank account to the account of the user.

13. The method of claim 11, wherein the majority class corresponds to non-fraudulent user profile data.

14. The method of claim 13, wherein the minority class corresponds to fraudulent user profile data.

15. A method for efficiently and accurately distinguishing between anomalous members of a majority class and members of a target minority class, the method comprising:

generating first training set data including a plurality of first training data profiles that are typical of conventional members of the majority class;

providing second training set data to an autoencoder including second training data profiles, the second training set data including data profiles that are known as anomalous members of the majority class or members of the target minority class, and the second training set data not including data profiles that are typical of conventional members of the majority class, wherein the autoencoder is trained, using a first machine learning process, to deconstruct and accurately reconstruct the first training data profiles, wherein the autoencoder includes an encoding neural network and a decoding neural network, and wherein training the autoencoder using the first machine learning process includes:

receiving a set of user profile data including characteristics data related to a user;

generating, using the encoding neural network, deconstructed user profile data from the set of user profile data;

generating, using the decoding neural network, reconstructed user profile data from the deconstructed user profile data; and iteratively adjusting parameters of the encoding and decoding neural networks until the reconstructed training data profiles match the first training data profiles within a threshold tolerance;

providing deconstructed second training set data from the autoencoder to a classifier; and selectively classifying, using the classifier, the deconstructed second training set data as either anomalous members of the majority class or as members of the target minority class, the selective classifying including:

refraining from classifying the profile data responsive to determining that the reconstruction of the data matches corresponding user profile data; and classifying, with the classifier, the profile data as an anomalous member of the majority class or a member of the target minority class responsive to determining that the reconstruction of the data does not match the corresponding user profile data.

16. The method of claim 15, wherein deconstructing the first training data profiles includes compressing the first training data profiles.

17. The method of claim 16, wherein the reconstructing the first training data profiles includes decompressing the first training data profiles.

18. The method of claim 15, wherein the deconstructed first training data profiles include fewer data elements than the first training data profiles.

19. The method of claim 18, wherein the first machine learning process includes iteratively adjusting the parameters of the encoding and decoding neural networks in generating the reconstructed first training data profiles until the decoding neural network generates first reconstructed training data profiles that match the first training data profiles within a selected tolerance.

20. The method of claim 15, wherein the second machine learning process includes generating target class identification training data indicating a probability that the second training data profiles belong in the target minority class.

21. The method of claim 20, wherein the second machine learning process includes iteratively adjusting the parameters of the third neural network until the probability is within a threshold probability of correctly identifying whether the second training data profiles belong in the target minority class.

22. A system for training an autoencoder and a classifier to efficiently and accurately distinguish between anomalous members of a majority class and members of a minority class, the system comprising:

one or more processors; and at least one memory coupled to the one or more processors and storing instructions that, when executed by the one or more processors, cause the system to perform operations including:

generating second training set data including a plurality of second training data profiles, the second training set data including data profiles that are known as anomalous members of the majority class or members of the target minority class, and the second training set data not including data profiles that are typical of conventional members of the majority class;

training the autoencoder, with a first machine learning process, to deconstruct and accurately reconstruct the first training data profiles, wherein the autoencoder includes an encoding neural network and a decoding neural network, and wherein training the autoencoder with the first machine learning process includes:

receiving a set of user profile data including characteristics data related to a user;

generating, using the encoding neural network, deconstructed user profile data from the set of user profile data;

generating, using the decoding neural network, reconstructed user profile data from the deconstructed user profile data; and iteratively adjusting parameters of the encoding and decoding neural networks until the reconstructed training data profiles match the first training data profiles within a threshold tolerance; and training the classifier, with a second machine learning process based at least in part on the second training set data, to identify members of the target minority class wherein the classifier includes a third neural network, and wherein training the classifier with the second machine learning process includes:

receiving reconstructed user profile data from the trained autoencoder;

selectively classifying user profile data corresponding to the reconstructed user profile data as an anomalous member of the majority class or a member of the target minority class based on whether the corresponding reconstructed user profile data matches the user profile data, the selective classifying including:

refraining from classifying the user profile data as an anomalous member of the majority class or a member of the target minority class responsive to determining that the reconstructed user profile data matches the user profile data; and classifying, with the classifier, the user profile data as an anomalous member of the majority class or a member of the target minority class responsive to determining that the reconstructed user profile data does not match the user profile data; and iteratively adjusting parameters of the third neural network until an accuracy of the selective classification is greater than a threshold accuracy.

* * * * *